(12) United States Patent
Hoffman et al.

(10) Patent No.: US 7,249,080 B1
(45) Date of Patent: Jul. 24, 2007

(54) INVESTMENT ADVICE SYSTEMS AND METHODS

(75) Inventors: Mark Hoffman, Norwell, MA (US); Donald A. McRae, Chagrin Falls, OH (US); Paul Samuelson, Newton, MA (US); Evan Schulman, Boston, MA (US); James L. Walker, Maynard, MA (US)

(73) Assignee: Upstream Technologies LLC, Boston, MA (US)

( * ) Notice: Subject to any disclaimer, the term of this patent is extended or adjusted under 35 U.S.C. 154(b) by 1128 days.

(21) Appl. No.: 09/696,762

(22) Filed: Oct. 25, 2000

Related U.S. Application Data

(60) Provisional application No. 60/161,258, filed on Oct. 25, 1999.

(51) Int. Cl.
*G06Q 40/00* (2006.01)
(52) U.S. Cl. ............................. 705/36; 705/35; 705/37; 705/38
(58) Field of Classification Search .................. 705/35, 705/37, 38; 345/700
See application file for complete search history.

(56) References Cited

U.S. PATENT DOCUMENTS

| | | | | |
|---|---|---|---|---|
| 5,918,217 | A | | 6/1999 | Maggioncalda et al. ...... 705/36 |
| 6,018,722 | A | * | 1/2000 | Ray et al. ...................... 705/36 |
| 6,064,985 | A | * | 5/2000 | Anderson ..................... 705/36 |
| 6,405,179 | B1 | * | 6/2002 | Rebane ......................... 705/36 |
| 6,484,151 | B1 | * | 11/2002 | O'Shaughnessy ............ 705/36 |
| 6,601,044 | B1 | * | 7/2003 | Wallman ...................... 705/36 |

FOREIGN PATENT DOCUMENTS

| | | |
|---|---|---|
| WO | WO 98/44444 | 10/1998 |
| WO | WO 99/28845 | 6/1999 |
| WO | WO 99/46658 | 9/1999 |

OTHER PUBLICATIONS

International Search Report Completed on Mar. 19, 2001 and Mailed on Mar. 27, 2001.
"Placemark Introduces "Total," First Production to Provide Comprehensive Tax Optimization for Individual Investors", Placemark Investments, pp. 1-2.
Figlewski, S. et al., "Optimal Aggregation of Money Supply Forecasts: Accuracy, Profitability, and Market Efficiency", pp. 38-54 reprinted from Journal of Finance, 28: 3, Jun. 1983, pp. 695-710.

* cited by examiner

*Primary Examiner*—Nga Nguyen
(74) *Attorney, Agent, or Firm*—Mintz, Levin, Cohn, Ferris, Glovsky and Popeo, P.C.

(57) ABSTRACT

The present invention provides investment advice systems. One version of the present invention provides investment advice systems that allow a user to select one or more advisors from a list of investment advisors. According to this version of the invention, the end user can receive advice on a particular transaction either separately from each investment advisor or in consensus. The system offers advice in part on the user's portfolio, tax position and risk profile and in part on the advisors evaluation of current market conditions. Thus, when a user is considering making a transaction, the user can obtain advice that can take into portfolio information including a user's proposed transaction and/or user portfolio information. A user armed with the above-described customized advice can execute a specific transaction and have their portfolio updated to reflect execution of that (those) order(s). In an alternative embodiment, a user's desire to buy or sell a security and/or a need for rebalancing a user's portfolio can generate transaction(s). As a result, the system will generate a buy/sell list (including recommended alternatives) from which a user can select.

30 Claims, 29 Drawing Sheets

GoalSeeker™ powered by Upstream Technologies

| My Accounts | Quotes & Research | My Profile | Help | | Quick Account Find: [  ] GO  LOGOUT |

Account List

View: [Custom...▼]  Account Value less than $600,000 [Change,Save]

| Account Name (Click a name below to view account detail) | Account Value | Cash Percentage | Performance (Current Month) | Benchmark | Risk Rating | Alpha |
|---|---|---|---|---|---|---|
| Christene Hanley - IRA | $243,011 | 13.8% | +10.7% | S&P 500 | 2.1 | 5.7 |
| Nancy Matheson - College Fund | $41,099 | 4.2% | +9.1% | Wilshire 5000 | 1.1 | 4.3 |
| Darrel Roberts - General | $443,930 | 10.1% | -4.0% | Custom Aggressive | 5.9 | 6.2 |
| Arnold Tobias - Retirement | $541,763 | 20.0% | +2.4% | Russell 2000 | 1.4 | 4.2 |
| Coralie Witter - Retirement | $444,321 | 11.3% | +12.0% | Russell 2000 | 2.7 | 3.5 |
| Mary Robertson - General | $223,230 | 1.8% | -5.2% | Custom Aggressive | 1.9 | 1.2 |
| Todd Spring - IRA | $113,031 | 11.8% | +4.7% | S&P 500 | 4.1 | 4.5 |
| Jonathan Smith - General | $400,201 | 5.8% | -4.4% | Wilshire 5000 | 2.2 | 2.3 |
| Joan Natalie - College Fund | $81,900 | 2.2% | +5.1% | Custom Conservative | 2.1 | 4.1 |
| Leslie Racowsky - Retirement | $111,200 | 3.2% | +7.7% | Wilshire 5000 | 2.5 | 3.6 |

Account Search GO  Performance Since: [Current Month ▼]

Stock Alerts

| Ticker | Stock Rating | Number of Accounts | Holding Value | Actions |
|---|---|---|---|---|
| AOL | ▲ Accumulate | 26 | $50,192 | View Accounts \| Sell |
| EBAY | ▲ Strong Buy | - | - | |
| LCOS | ▲ Buy | - | - | |
| MSFT | ▽ Hold | 15 | $10,299 | View Accounts \| Sell |
| NXTL | ▲ Accumulate | 10 | $34,837 | View Accounts \| Sell |
| YHOO | ▲ Strong Buy | - | - | |

Risk Alerts

| Account Name | Risk Rating |
|---|---|
| Darrel Roberts - General | 5.9 |
| Jerry Glover - IRA | 5.5 |
| Jordan Malick - General | 5.2 |
| Tim Brennan - General | 5.0 |
| James Slusser - College Fund | 5.0 |
| Bob Young - Retirement | 4.5 |
| Joan Young - Retirement | 4.5 |

GoalSeeker™ powered by Upstream Technologies

Quick Account Find: [ ] GO    LOGOUT

| My Accounts | Quotes & Research | My Profile | Help |

Trade Execution Results
Darrell Roberts - General

[Refresh]  [Return to Account]

| Status | Change | Cancel | Action | Ticker | Shares | Type | Price | Value |
|---|---|---|---|---|---|---|---|---|
| Executed | - | - | Sell | DELL | 1000 | Market | - | +$43,250 |
| Transmitted | [Change] | [Cancel] | Buy | AAPL | 500 | Limit | 85 | -$42,500 |
| Cancelled | - | - | Sell | KO | 2000 | Market | - | +$106,750 |
| Pending | [Change] | [Cancel] | Buy | ODWA | 17667 | Market | - | -$106,002 |

[Refresh]  [Return to Account]

Save Trade Template

To save this trading template for rebalancing other accounts, specify a name for this template below and click the "save" button:

[          ]  [Save]

Fig. 14

GoalSeeker™
*powered by*
*Upstream Technologies*

| My Accounts | Quotes & Research | My Profile | Help |

Quick Account Find: [____] (Go)

LOGOUT

Trade Templates | Class Definations | Account Views

| Trade Templates | | Creat New Template |
|---|---|---|
| Name | Date: | Click "Go" to Start the Rebalancing Wizard for all Accounts with Benchmark Equal to... |
| Align Aggressive [Edit,Delete] | 05/31/00 | [Custom Aggressive ▼] (Go) |
| Align Retirement [Edit,Delete] | 05/31/00 | [Custom Aggressive ▼] (Go) |
| Rebalance General 5/30 [Edit,Delete] | 05/30/00 | [Custom Aggressive ▼] (Go) |
| Align Wilshire [Edit,Delete] | 05/24/00 | [Custom Aggressive ▼] (Go) |
| Align Custom B [Edit,Delete] | 05/16/00 | [Custom Aggressive ▼] (Go) |
| Align Custom A [Edit,Delete] | 05/16/00 | [Custom Aggressive ▼] (Go) |

Fig. 15

INVESTMENT ADVICE SYSTEMS AND METHODS

CROSS-REFERENCE TO RELATED APPLICATIONS

This application claims priority to U.S. Provisional Application Ser. No. 60/161,258 filed on Oct. 25, 1999, entitled "Investment Advice System," incorporated herein by reference in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

This invention relates generally to the field of investment advice systems and more specifically to investment advice systems and methods that allow a user to receive advice over a network, e.g., the Internet.

In the past few years, the retail brokerage and financial analyst industries have developed a number of electronic systems accessible over the Internet to provide users, e.g., investors with investment advice. The term "user" as used herein encompasses both an individual investor and that investor's representative(s) such as a financial planner. Some of the recently developed electronic systems perform mathematical calculations to provide advice regarding a variety of investment decisions, such as mortgage refinancing, loan amortization, and retirement planning.

However, these financial advice systems typically are limited in several ways. To the extent that these electronic services provide advice regarding specific securities, the advice often does not take into account information about the user's portfolio and the form of the advice tends to replicate old-fashioned, broker-centric, research reports distributed through conventional postal mail distribution systems.

These electronic security research reports provide information on a particular company specified by a user. The reports rarely suggest alternatives or offer different opinions. Further, the electronic systems deliver the reports in prose, which requires time to read and comprehend. In other words, current electronic security research reports have drawbacks in the information they supply and in their method of delivery of information.

The electronic systems typically do not customize the information they provide in that the provided information does not take into consideration a user's existing portfolio or how a user's portfolio compares to various market measures in terms of risk and reward. These electronic systems do not inform a user how a proposed transaction will impact the user's portfolio in terms of metrics that characterize the user's portfolio. Furthermore, such information is not provided when the user is deciding whether to go forward with a transaction, nor is it delivered in an immediately comprehensible form. Instead, the user must read the report(s), remember the information and, in one manner or another, contact his or her broker to go forward with the transaction. Further, many of these systems are not accessible by many users.

In other words, there are at least the following three drawbacks to existing financial advice systems: 1) only a fraction of investors are receiving investment advice; 2) those currently receiving investment advice receive advice that is incomplete, inconsistent and/or not timely; and 3) mutual funds and broker/planners are often not integrated into the advice system so as to increase productivity and distribution of advice. With respect to the first point, financial institutions currently provide advice almost exclusively to high net worth households, e.g., households with assets of over five million U.S. dollars. However, households with assets of between one hundred thousand and five million U.S. dollars have recently become more active in investing and in managing their wealth.

With respect to the second point, i.e., not receiving complete, consistent and timely advice, mutual finds charge a management fee and are managed without regard to tax consequences. Brokers or financial planners often know only a portion of products available and sometimes give inconsistent advice. Further, online financial services and products tend to be security specific and do not take into account the user's portfolio or tax position as noted above.

With respect to the third point, Forrester Research in "Overhauling Financial Advice" February 2000, incorporated herein by reference in its entirety, estimates that approximately twenty million households will use automated online advice solution by 2005. Thus, mutual funds and brokers/planners require productivity tools to facilitate handling larger client bases and to provide better services and new services.

Thus, the financial services community needs a system that allows a user to interactively explore the impact that one or more proposed transactions would have on the user's financial account. The system should provide advice to the user based at least in part on the user's specification as to his preferred risk/reward balance. The system should provide the user with the ability to obtain a variety of information including: 1) the impact that the transactions would have on the risk/reward balance of the user's portfolio; 2) the impact on the quality of stocks held in the user's portfolio as determined by advisors, either separately or combined; 3) the forecast for the stocks involved in the proposed transaction as determined by advisors, either separately or combined; 4) and/or the tax implications of the proposed transaction(s).

Expanding on the last point, a need exists for a system that provides advice on a proposed transaction based at least in part on the tax consequences of that transaction. For example, a system is needed that advises against realizing gains by selling a position in a security that would soon qualify for long-term capital gains status.

Thus, a need remains for an investment advice system that provides clear, easy-to-comprehend advice, customized to the user as to that user's portfolio holdings, tax position and risk profile at the time the user is reviewing his/her portfolio and/or considering making a transaction. In other words, a need exists for an investment advice system that provides effective advice at the point of sale, i.e., when the user is capable of making a financial transaction.

Further, a need exists for an investment advice system that allows a user access to more than one opinion on a particular potential security transaction. A need exists for a system that allows a user to select advisors from a group of advisors. In addition, a need exists for an investment advice system that allows a user to obtain a consensus, i.e., the pooled or combined opinions of more than one advisor, on a proposed transaction or on the condition of the user's portfolio.

SUMMARY OF THE INVENTION

The present invention provides systems and methods for providing investment advice. The systems and methods of the present invention are particularly suited to network-based investment advice services that provide investment advice and manage securities portfolios for clients, such as individual investors or financial planners, over a computer network, such as the Internet.

In accordance with one embodiment of the present invention, a system for implementing an investment advice service may include a server computer hosting an investment advice service accessible via client computers to a plurality of clients and a database operably coupled to the server computer. The database may identify a plurality of securities portfolios and may maintain portfolio information associated with the security portfolios. The investment advice service preferably includes a user interface including controls whereby a client can access portfolio information concerning a securities portfolio identified by the database. The investment advice service is preferably available via a computer network to assist a client in managing a securities portfolio identified by the database. The investment advice service may include a trade advisor component hosted by the server computer and operatively coupled to the database to receive portfolio information for a securities portfolio of the client. The trade advisor component may include an asset allocator component operable to compare the portfolio information received by the trade advisor component with a benchmark portfolio for the securities portfolio. The trade advisor component preferably proposes securities transactions to the client at least in part based on the comparison by the asset allocator of the portfolio information with the benchmark.

The terms "client" and "clients" as used herein may refer to an individual investor, a financial planner or financial institution that may manage one or more securities portfolios, or any other person, business, or entity that may transact with an investment advice system to receive investment advice and/or portfolio management services.

In accordance with an additional aspect of the present invention, the investment advice service may include a security ranking aggregator component hosted by a server computer and operably coupled to the trade advisor component. The security ranking aggregator may be operative to receive security ratings for securities from of a plurality of security analysts and to aggregate the security ratings for each security onto a uniform ranking scale. The trade advisor component preferably proposes securities transactions to the client at least in part based on the rankings of securities provided by the security ranking aggregator component.

In accordance with a further aspect of the present invention, the portfolio information maintained by the database may include tax lot information for the portfolios identified by the database. Preferably, the trade advisor component is operative to receive the tax lot information for a securities portfolio of a client and to propose securities transactions for the securities portfolio at least in part based on the tax lot information for the securities portfolio.

In accordance with another aspect of the present invention, the investment advice service may include a broker connection aggregator hosted by a server computer and operably connected to the trade advisor component. The broker connection aggregator preferably has a broker interface for communicating with a plurality of brokers over the computer network. The broker interface allows a client to execute securities transactions with one of the plurality of brokers through the investment advice service.

In accordance with a further aspect of the present invention, the investment advice service includes a portfolio tracker component hosted by a server computer and operably coupled to the database. The portfolio tracker component preferably has a portfolio interface for receiving portfolio information concerning a securities portfolio from a client and is preferably operative to interface with the database to maintain the portfolio information in a securities portfolio identified by the database. The portfolio tracker component is preferably operative to establish a benchmark for a portfolio of a client based on risk information received from the client.

In accordance with another aspect of the present invention, the asset allocator may include a risk ranking component operative to compare the portfolio information received by the trade advisor component with the benchmark to provide a risk rating for the securities portfolio.

In accordance with one embodiment of the invention, a computer-implemented method for providing investment advice to a client over a computer network includes providing access over a computer network to a database maintaining portfolio information for a plurality of securities portfolios and managing a securities portfolio identified by the database for a client. The securities portfolio may be managed by requesting portfolio information for the securities portfolio from the database, comparing the portfolio information to a benchmark for the securities portfolio, and proposing securities transactions to the client based at least in part on the comparison of the portfolio information with the benchmark for the securities portfolio.

In accordance with a further aspect of the present invention, the computer-implemented method may include collecting security rankings for a security from a plurality of security analysts and aggregating the security rankings for the security onto a uniform ranking scale. The security rankings are preferably normalized to a set of integer values. Securities transactions may be proposed to the client based at least in part on the uniform ranking of the securities.

In accordance with another aspect of the present invention, the computer implemented method may include requesting tax lot information from the database for the portfolio and proposing securities transactions to the client based at least in part on the tax lot information for the securities portfolio.

In accordance with a further aspect of the present invention, the computer implemented method may include providing a broker connection to a plurality of brokers over the computer network and allowing a client to execute securities transactions, through the broker connection, for securities portfolios identified by the database.

In accordance with another aspect of the present invention, the computer implemented method may include receiving portfolio information for a securities portfolio from a client and storing the portfolio information for the securities portfolio in the database.

In accordance with a further aspect of the present invention, the computer implemented method includes requesting risk information for a client for a portfolio identified by the database and establishing a benchmark for the portfolio based on the risk information.

The method for providing investment advice to a client over a computer network can be implemented as a set of processing instructions, stored in a computer readable storage medium, for executing the steps of the method.

BRIEF DESCRIPTION OF THE DRAWINGS

The present invention is illustrated by way of example, and not by way of limitation, in the figures of the accompanying drawings. Like reference numerals refer to similar elements.

FIG. 10 shows one embodiment of the "my accounts" screen of FIG. 9.

FIG. 11 shows one embodiment of the "search accounts" screen of FIG. 9.

FIG. 12 shows one embodiment of the "account detail" screen of FIG. 9.

FIG. 13 shows a different setting of the "account detail" screen of FIG. 11.

FIG. 14 shows one embodiment of the "trade execution results" screen of FIG. 9.

FIG. 15 shows one embodiment of the "trade templates" screen of FIG. 9.

Figure 1:
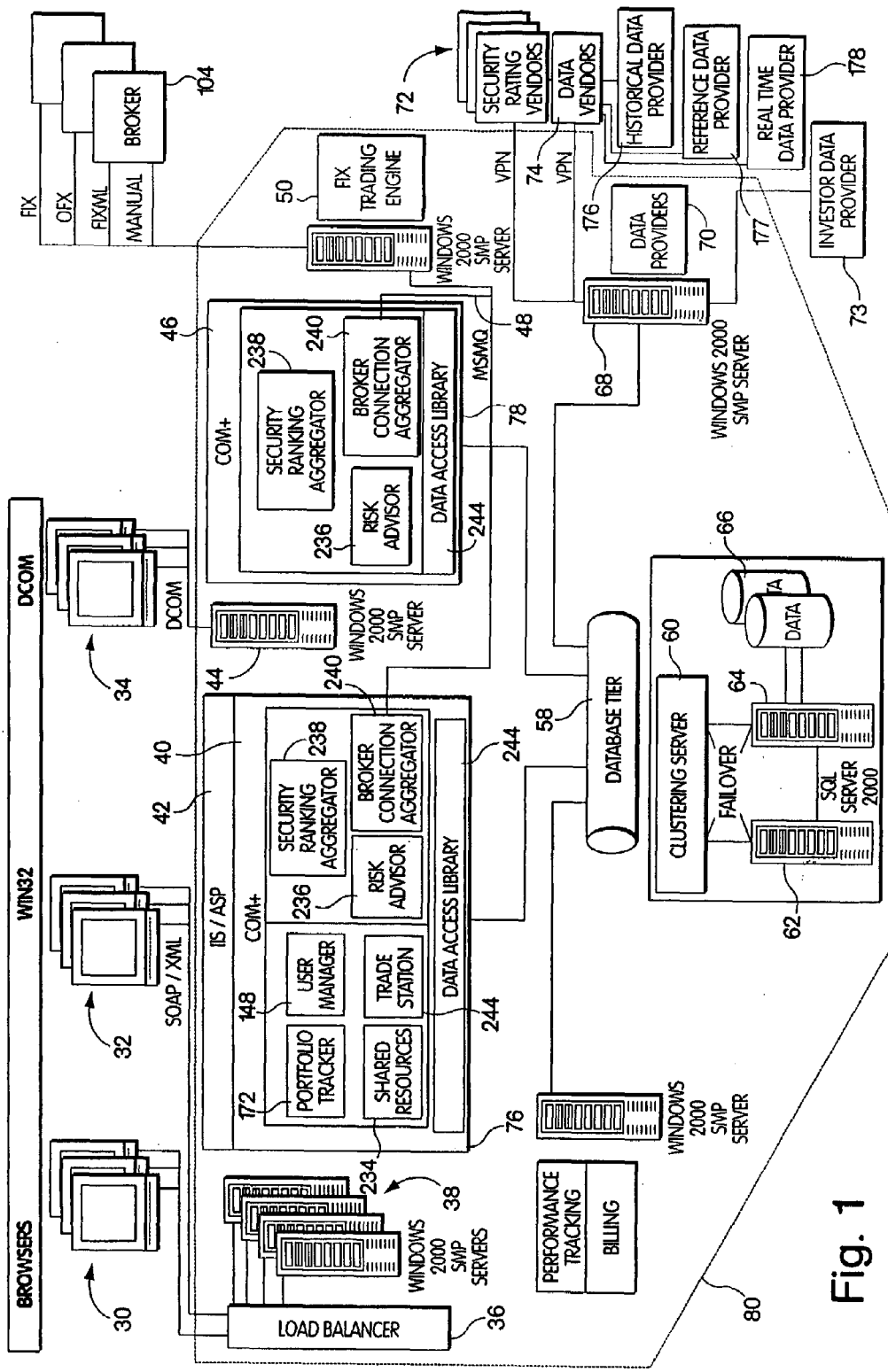
FIG. 1 is a deployment view of one embodiment of the invention.

The figures depict embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION OF THE ILLUSTRATED EMBODIMENTS

To achieve the goal of providing point-of-sale advice the invention encapsulates client risk information with the concept of a Benchmark Portfolio. Clients can chose to use benchmarks such as the S&P500 or the Wilshire 5000. In one embodiment, a client can also establish a customized benchmark that meets the client's risk/return objectives. The system then compares client portfolios against the selected standard in terms of diversification, factor exposure, the value-weighted average ranking and performance. A client portfolio generally consists of approximately 20 securities or more, selected from among the best securities as ranked by the advisor(s) picked by, or for, the client, bearing in mind the client's current holdings and tax position.

Regarding Expert Advise

In one embodiment, the invention presents stock recommendations from multiple sources. Each source supplies recommendations about future stock returns on a wide universe of stocks. The recommendations are information consistent with one another and are updated frequently. In contrast, currently available recommendations apply to a small number of stocks, are not designed to be information consistent with one another, and are updated sporadically. Setting standards for the recommendations and maintaining those standards improves the usefulness of the system. The system can monitor the performance of the recommendations in forecasting stock returns and can report the performance to users of the system.

In another embodiment, the system processes the recommendations from each source such that the recommendations contain the maximum amount of usable information. The system standardizes the recommendations to an integer ranking system, e.g., from 5 to –5, where 5 is best and –5 is worst. The system performs the standardization by normalizing the recommendations to a unit normal distribution and then creating ranges of values, which are mapped into ranking categories. If the recommendations include only limited categories (such as strong buy, buy and hold), then appropriate ranking ranges are created for them.

In yet another embodiment, the invention combines the rankings from multiple sources, such that the combined ranking contains the most usable information. The system uses estimates of the correlation of rankings from different sources and correlations of each set of rankings with future returns The system directly estimates the correlations between sets of factors. The system also estimates the correlations of each factor set with future returns. However, because these estimates are typically unstable, the system provides estimates of these correlations (which can be over-ridden by the investor). The system then determines the optimal weighting scheme on each factor set. Specifically, the system minimizes the weighted variance of the factors and actual returns. In one embodiment, the system can impose some restrictions on individual factor weights (for example, requiring that the factor weights each take positive values). Stephen Figlewski and Thomas Urich discuss the aggregation of forecasts in "Optimal Aggregation of Money Supply Forecasts: Accuracy, Profitability, and Market Efficiency", Journal of Finance, 28; 3, Jun. 1983, 695–710, incorporated herein by reference in its entirety.

In the case of stocks with rankings from only one or two sources, the system revises the recommendation weights in creating the combined rankings. The system transforms the weights after the optimization process so that the weights add up to 1. The system creates combined rankings by multiplying each set of rankings by its weight and then rounding the weighted rankings to the nearest integer, e.g., between 5 and –5.

In still another embodiment, the investor can over-ride or ignore particular rankings in order to best capture her views of future stock performance. She can also supply a ranking, which overrides all other rankings and becomes her combined ranking for the stock. The system can retain the investor's over-rides subject to investor revisions in the future.

Thus, the system provides the user advice on a large number of stocks, which she can apply in managing her portfolio and in evaluating her list of potential purchases. Stocks highly recommended by analysts generally outperform the market over the long term. Similarly stocks that are unfavorably recommended by analysts generally under perform the market over the long term. Brad Barber, Reuvan Lehavy, Maureen McNichols, and Brett Trueman, in "Can Investors Profit from the Prophets? Security Analyst Recommendations and Stock Returns", indicate that strategies of purchasing the stocks with the most favorable consensus (combined) recommendations or selling short the stocks with the least favorable recommendations produced an annual abnormal gross return of more than about four percent. An embodiment of a system according to the invention presents valuable advice to an individual investor who is preparing to make a transaction by providing a consensus of selected advisors or, alternatively, by providing a consensus of all available advisors.

Another benefit to the user is that she can use the rankings to compare individual stocks and compare the average ranking of her current portfolio to a portfolio after trades or to a benchmark portfolio (such as the S&P 500). Still another benefit is that she can over-ride rankings on particular stocks, when she chooses to rely on her own views or opinions from other sources.

Regarding Portfolio Risk Estimates

Another version of the system calculates and reports risk estimates for individual stocks and for portfolios. The system provides risk estimates that comply with the views of many investors concerning portfolio risk.

Figure 12:
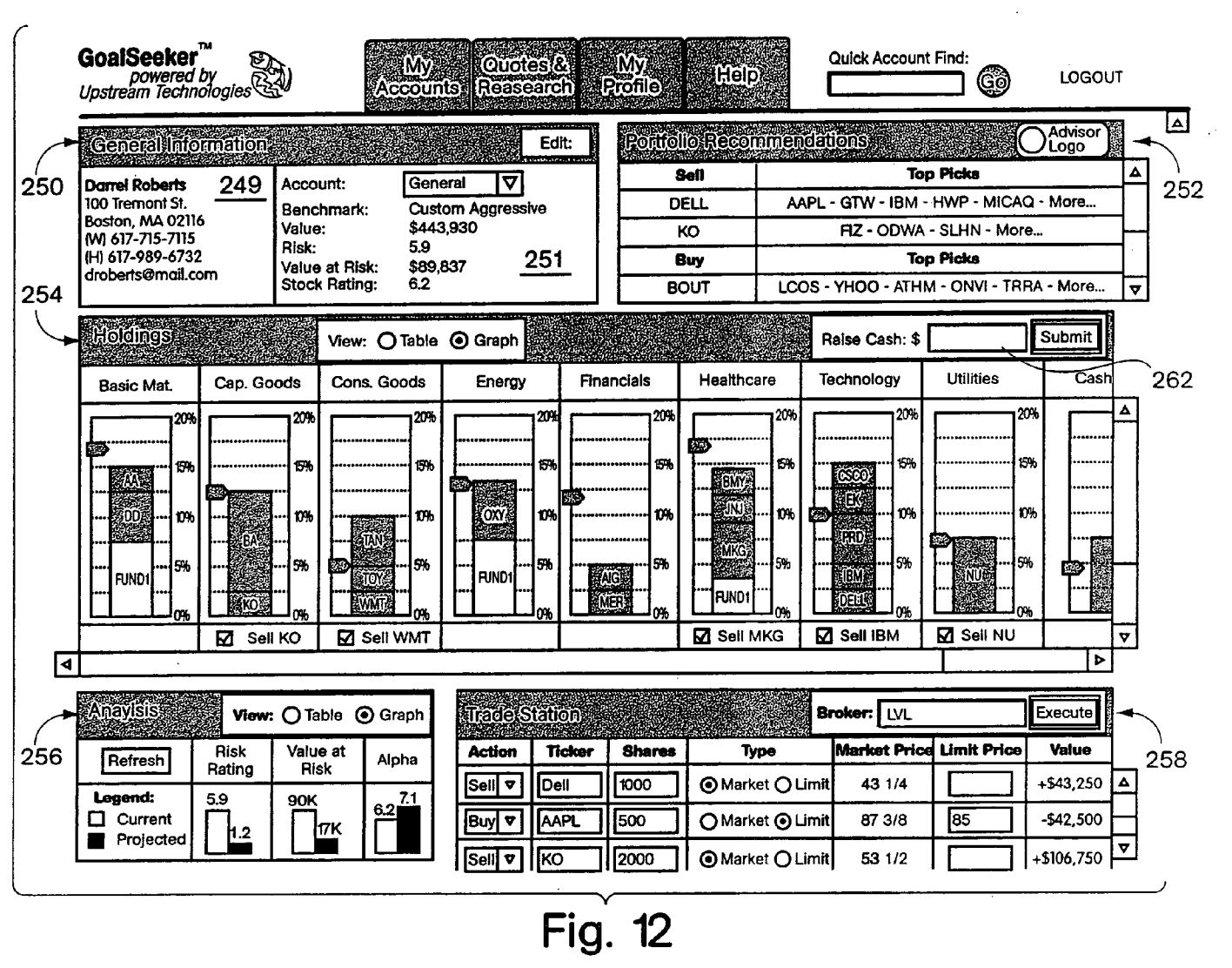

In one embodiment, the underlying risk model takes into account common factors, sector exposure and individual stock exposure. The system keeps the common factors to a short list (Price/Earnings, Price/Book, Roe, Capitalization, Market Risk). Many investors can interpret these common factors, each of which impacts portfolio returns. The sensitivity of individual companies to each factor depends on stock characteristics with which investors are familiar. The system defines sectors quite broadly and the system communicates the broad sector definitions through its on-screen displays, e.g., through a display of a portfolio associated with an account as shown in FIG. 12.

The system estimates factor covariances with one another by running multiple regressions of weekly stock returns versus their factor values. The system interprets the coefficients on each factor as the returns from the factor in each week. The system takes the residuals, which represent stock returns, from these regression equations and calculates the average return for each sector (based on capitalization weights). Finally, the system calculates the residual returns of individual stocks by deducting each stock's factor and sector returns from its total return. From these residuals, the system estimates a residual standard deviation. The system can translate all risk measures into annual terms.

In another embodiment, the system calculates portfolio risk measures that are useful to an investor and that a typical investor can understand. The system provides an average risk ranking for stocks in the portfolio. The system also provides a traditional measure of risk, i.e., the standard deviation of return over a specified time period, e.g., over a year. The system separates this risk into components: exposure to common factors, sector exposures and individual stock concentration.

In addition, the system provides two measures of risk, which address the portfolio's potential to lose money. The first measure is Value at Risk (VaR), which is a threshold measure of the minimum amount of what an investor might lose in a very bad market. The second measure is Expected (Large) Loss, which is a measure of how much an investor should expect to lose in a bad market. The system estimates both measures based on the risk of the portfolio with adjustments for the fact that portfolio returns have thick tails. Specifically, in one embodiment, the system takes the estimated standard deviation of the portfolio return (which assumes a normal distribution of stock returns) and transforms it to a t-distribution with pre-determined degrees of freedom and a similarly scaled standard deviation. The system then performs the VaR and Expected (Large) loss calculations conditional on the t-distribution. In this way, investors benefit from more accurate estimates of the potential for losing money.

In still another embodiment, the system calculates and translates marginal risk estimates for individual stocks into rankings (scaled appropriately versus the rankings based on recommendations). The system shows an investor whether a stock is risky in the context of her portfolio and what the source of risk is—from factor exposure, sector exposure or concentration in the particular stock.

These stock calculations follow similar partitions to that employed for the portfolio risk measures. The system can present the stock calculations both in terms of variance (traditional risk measures) and in terms of rankings (scaled appropriately versus the return rankings). In particular, the system transforms the risk estimates into rankings in a procedure similar to that of transforming individual rankings. The scaling of the rankings depends on the risk levels and the investor's aversion to risk.

The investor can use these marginal risk rankings to evaluate the risk of different stocks in the context of her portfolio. The system can also use these rankings in making suggestions to the investor about potential purchases and sales.

The investor benefits from receiving simple and intuitive risk estimates, which are scaled in proportion to the return rankings. The investor can follow the recommendations of the portfolio analyzer to reduce risk because the risk estimations for individual stocks are plausible. The system allows the investor to understand the potential for loss in her portfolio and more appropriately position the portfolio to a risk level with which she is comfortable.

Regarding the Suggest/Respond Portfolio Rebalancing Environment

The system allows an investor to interact with the system to adjust the positions in her portfolio. One embodiment of the system suggests potential purchases and sales, which change based on an investor's trades and on investor changes in return rankings. The system also responds to trades suggested by the investor.

When the investor opens up her portfolio in the system, she receives suggestions for trades in particular sectors. Motivations for suggestions include changes in advisor return rankings, changes in tax consequences and changes in risk rankings. Each suggested trade has a size associated with it as well as alternative trades. The system allows an investor to review the rankings and over-ride the rankings. Over-riding the rankings causes the system to change its recommended actions.

In addition, the investor can suggest certain securities to be ptraded. The system provides return and risk rankings (and the tax consequences if the trade involves a sale of a security held in the portfolio). With the return ranking, the system can recommend a purchase or sale of a particular size. The investor can initiate a trade, which the system does not recommend resulting in a response by the system about the trade's suitability.

The system provides investors with suggestions of exactly how much to purchase or sell of individual stocks. In addition, the system provides alternative suggestions of stocks to buy and sell with recommended purchase amounts.

Tax Management Features of the Site

In another embodiment of a system according to the invention, the system identifies all sales (above threshold which the investor can define) resulting in realized losses (and tax savings). The system provides the investor with an opportunity to review these trades and accept them as a group or individually. The system also accepts user-defined thresholds for not proposing the sale of stocks (with high unrealized gains). For stocks with moderate unrealized taxable gains and losses (falling neither in a "must sell" or a "never sell" category, the system creates a properly scaled tax rating (consistent with the return and risk rankings), which the system uses when it is either suggesting sales or responds to user suggestions.

System Architecture

One medium for expressing the system architecture of the present invention is the Unified Modeling Language (UML). The system architecture utilizes various elements of the Unified Process and expresses the architecture using UML. Based on the Unified Process, the following different and interlocking views model the system architecture.

Deployment View

The deployment view of a system encompasses the nodes that form the system's hardware topology, upon which the system executes. This view primarily addresses the distribution, delivery, and installation of the parts that make up the physical system. The system architecture utilizes a combination of Deployment and Component diagrams to illustrate where the system executes various packages and to define the underlying network topology requirements.

Use Case View

The system architecture is use-case driven, placing an emphasis on how one uses the system. The medium to communicate the Use Case View is Use Case Diagrams and Use Case Cards. The Use Case View overlaps all other views because each view begins with an analysis of Use Cases.

Design View

The design view of a system encompasses the classes, interfaces, and collaborations that form the vocabulary of the problem and its solution. This view primarily supports the functional requirements of the system, meaning the services that the system should provide to its users. The system architecture utilizes Class Diagrams, Class-Responsibility-Collaboration Cards (CRC Cards) to express class relationships and interface definitions. Where appropriate, a developer can develop similar Class Diagrams using a Visual Modeling tool such as Microsoft Visual Modeler or Rose 2000.

Process View

The process view of a system encompasses the threads and processes that form the system's concurrency and synchronization mechanisms. This view primarily addresses the performance, scalability, and throughput of the system. The system architecture utilizes Sequence Diagrams and Collaboration Diagrams in modeling interactions between multiple classes. The system architecture uses State Diagrams when modeling state transitions on single classes.

Component View

The component view of a system encompasses the components that comprise one embodiment of the physical system. This view primarily addresses the configuration management of the system's releases, made up of somewhat independent components that one can assemble in various ways to produce a running system. The system architecture utilizes a combination of Deployment and Component diagrams to illustrate where various interchangeable components can be plugged into the system to deliver unique solutions.

Having described different views that can model the system architecture, one version of a deployment diagram of an investment advice system according to the invention is shown in FIG. 1. The majority of the application can run remotely from a client 30, 32, 34 as depicted by the dotted line 80 surrounding the server computers 38, 44, 48, 56, 62, 64, 68. The client technology used to access the application can range from a thin client, e.g., a generic hypertext markup language (HTML) browser 30, to a rich client, e.g., a full functioning Windows Desktop application 32 or other legacy application.

A browser client 30 can access the system via the hypertext transfer protocol (HTTP) over a network, for example, a public Wide Area Network (WAN) such as the Internet. Thus, in one embodiment, the browser clients 30 and the load balancer are each connected to a WAN and can communicate over the WAN. As a result, browser clients 30 connect to at least part of the application 76 through a Load Balancing Server 36, which routes requests to one of many servers such as Microsoft Windows 2000 Servers 38 running Microsoft Internet Information Server (IIS) available from Microsoft Corporation of Redmond, Wash.

According to the illustrated embodiment, ActiveX Server Pages (ASP) of IIS 42 generate HTML web pages. ASP pages contain scripts, which will transform information from the COM+ middle tier 40 into HTML by combing eXtended Style sheet Language (XSL) and data contained in eXtended Markup Language (XML) streams. COM+ 40, an extension of Component Object Model, is both an object-oriented programming architecture and a set of operating system services.

The HTML pages and user requests interact directly with various software components, which are running on the server inside of a COM+ application 40. These components include the Portfolio Tracker 172, the User Manager 148, the Trade Station 180, and the Shared Resources Manager 234. These components accept and validate user requests, passing along requests to the Application Service Provider Components (ASPC). In this embodiment, the ASPCs are also running within COM+, but user requests do not access the ASPCs directly. The components include the Security Ranking Aggregator 238, the Risk/Trade Advisor 236 and the Broker Connection Aggregator 240. These components access the database through a set of Data Access Library routines 244, which are also part of the COM+ application 40.

An alternative to a Browser client 30 is a more highly functioning Desktop application 32. A typical desktop application possesses more processing intelligence than a Browser and therefore will provide its own user interface. This type of application is generally limited to making information and transaction processing requests and generally does not use HTML streams. The protocol for making such requests and returning results is called the Simple Object Access Protocol (SOAP). SOAP uses the underlying HTTP transport to package requests into XML streams and call methods on a Server. SOAP requests take a more direct path to the ASPC services than do browser requests. The called server returns results of the request to the calling application via XML.

In a third embodiment, user system 34 can connect to at least part of the application 78 using a distributed COM or DCOM protocol which is capable of working with the ASPC services remotely. DCOM allows the client 34 to connect to a running instance of a software component that exists on another platform. System designers typically use this method of communication in a scenario where the designers know the client well and the client requires a higher degree of performance and integration. System designers use this scenario, for example, for business customers who want to use only a portion of the ASPC services. For example, a likely scenario would be for a business customer to use the Security Ranking Aggregator 238 service and nothing else. Requests come directly from the client's legacy application 34 and drive the component using DCOM. Each of the ASPC components 236, 238, 240 are capable of being used individually. Deploying a server 44, which accommodates this scenario does not require IIS or ASP and, as illustrated, does not use load balancing. This server can be housed in a variety of location such as in a data center or on a customer site.

There are several other external interfaces to the system 80 in addition to the interface(s) to clients, e.g., clients 30, 32, 34. The Broker Connection Aggregator component 240 communicates with Brokers 104 in order to pass orders and monitor execution. A separate server 48 connects with Brokers 104. This platform runs a trading engine 50, which in one embodiment communicates with several brokers 104 concurrently. This embodiment of the trading engine 50 can communicated using different protocols. Some of the common industry protocols that the trading engine 50 can support include FIX, OFX and FIXML. If a broker 104 does not support an electronic interface, the system can use a manual interface to communicate with the broker. For example, the system or an operator associated with the system can use the telephone to communicate with traders at the Brokers trading desk. The Broker Connection Aggregator 240 can communicate with the Fix Trading Engine 50 using message management software such as Microsoft Message Queue (MSMQ) available from Microsoft Corporation of Redmond, Wash. MSMQ is a software service, which allows requests to a server to be queued while the requested application on the server continues processing. As the Fix Trading Engine 50 receives notifications back from the Broker 104, MSMQ can be used again to send messages back to the Broker Connection Aggregator 240.

Other external interfaces deal with the collection of data. The system 80 can collect Security Ratings data from vendors, for example, over a private network connection and can load the data into database 58, typically after the data is scrubbed and normalized. Similarly, the system 80 can collect, validate, and store historical price data, reference data and current market data in database 58 for use in the static and dynamic risk calculations described below.

In one embodiment, the database tier 58 is implemented on a standard query language (SQL) server such as Microsoft SQL Server 2000 available from Microsoft Corporation of Redmond, Wash. The database tier 58 makes use of a Cluster Service to provide failover support. The cluster service includes a clustering server 60, standard query language (SQL) servers 62, 64 and databases 66. Data mining is carried out on another server 56, which extracts information from the production database and creates reports for performance tracking 52 and billing 54.

As will be clear to those of skill in the art, a system according to the invention can take a variety of forms and can serve a variety of clients. Thus, the system illustrated in FIG. 1 is illustrative and not limiting, resort to the claims being necessary to determine the inventive subject matter.

Business Use Case Analysis

Figure 2A:
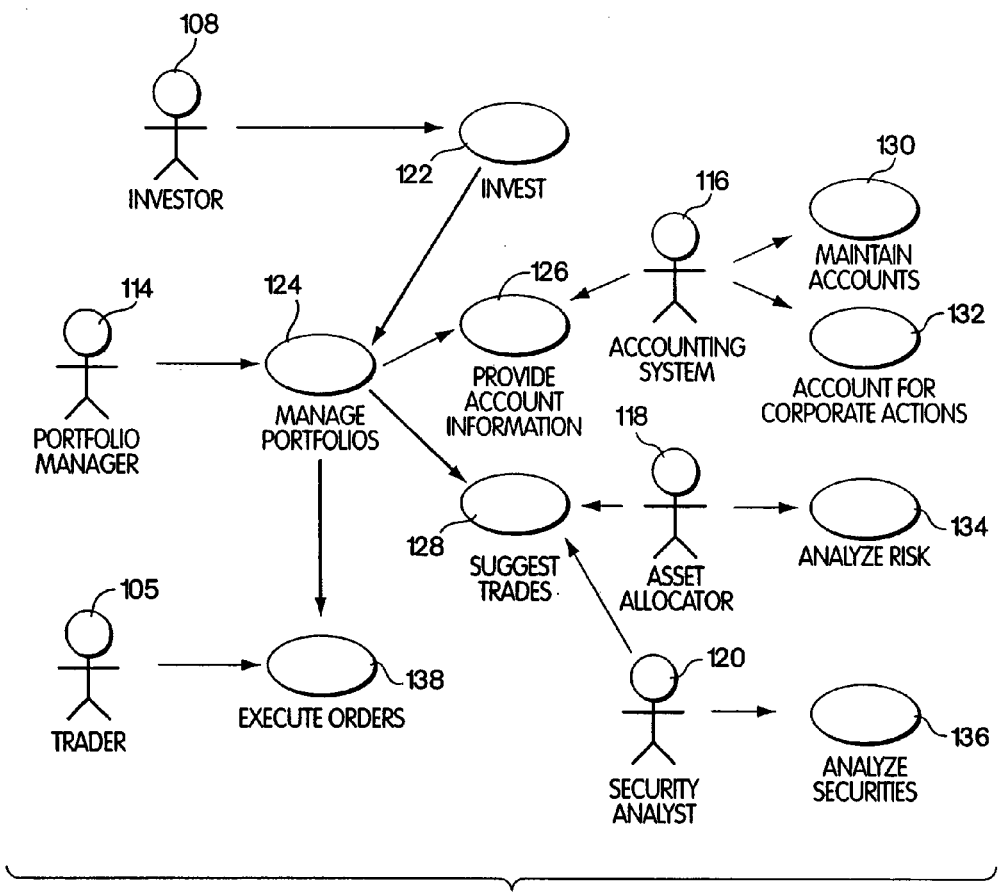
FIG. 2A is a business use case diagram for the investment advice system of FIG. 1.

The use-case view of a system encompasses the use cases that describe the behavior of the system as seen by its users. In the Business Use Case Model each business use case represents a business process, described from an "external" viewpoint. The Business Use-Case Analysis shown in FIG. 2A illustrates the major business Use Cases and identifies the major Actors. Actors are entities, either people or other systems such as software agents, which drive the system in an effort to achieve a specific goal. In addition, the business use cases outline specific scenarios that identify intermediate players and sub-goals.

Based on the Use Case Diagram of FIG. 2A, there are six major Actors (either people or systems) that have responsibilities to carry out the primary Use Case, which is 'Invest'. Apart from the 'Investor' all other actors are responsible for subordinate Use Cases. In other words, all of the Use Cases, except for 'Invest', are ways in which the other Actors accomplish the goal of the 'Investor'. The Actors are:

Investor 108

This actor is an end-customer. This actor is not necessarily the user of the system, but is serviced by the system through the portfolio manager.

Portfolio Manager 114

In one embodiment, the portfolio manager 114 is the primary user. One of the portfolio manager's goals is to maximize the return on her portfolio accounts by intelligently selecting trades that adjust the risk rankings of the portfolios. A secondary goal for this actor is to maximize the number of portfolios under her control subject to the constraint of providing a high level of service to her customers, individual investors. In another embodiment, the Portfolio Manager 114 and the Investor 108 are the same.

Accounting System 116

The accounting system 116 updates the accounts for the investor 108 to ensure proper recording of transactions pertaining to the investor's activities including individual trades and corporate actions such as stock splits.

Asset Allocator 118

The asset allocator 118 makes trade suggestions based on a risk and return analysis of an investor's portfolio. A goal of this actor is to provide the Portfolio Manager 114 with a list of trades that improve the Investor's Portfolio in terms of its combined ranking.

Security Analyst 120

The security analyst 120 analyzes a universe of securities and provides a rating on each security, which can then be used to provide suggestions as well as alternatives to the Portfolio Manager 114.

Trader 104

The Trader 104 is responsible for sending trades to the broker (shown in FIG. 2A), deciding limit prices, if any, and monitoring executions from the broker. One goal for the trader is to execute the Portfolio Manager's Trades and notify the Portfolio Manager 114 when the trader has executed or attempted to execute all trades.

The system can use the following three scenarios to implement the "Invest" Use Case:

Raise Cash
Spend Cash
Rebalance

Raise Cash

This scenario involves specifying an amount of cash for the system to raise by selling portfolio holdings. The asset allocator 118 provides a list of suggestions by combining information from analyzing the risk of the portfolio and from analyzing the Security Analyst ratings of held securities. The asset allocator 118 can tailor sell recommendations to mitigate capital gains taxes. Thus, if a particular security that is the subject of a proposed trade is close to qualifying for long-term capital gains treatment, the asset allocator 118 can take that information into account in advising the client regarding the sale of that security. Similarly, the asset allocator 118 can recommend the sale of a poorly performing security and the purchase of a promising security in the same sector to obtain favorable tax treatment while maintaining portfolio diversity.

Spend Cash

This scenario involves specifying an amount of cash for an investor to spend buying securities. The asset allocator 118 provides a list of suggestions by combining information from analyzing the risk of the portfolio and from analyzing the Security Analyst ratings of securities both held by the portfolio and not held by the portfolio. Buy recommendations typically spread portfolio risk over several Benchmark Categories such as Industry/Sector.

Rebalance

This scenario relies on the asset allocator 118 to provide a list of buy and sell recommendations that improve the investor's overall portfolio combined ranking. The asset allocator 118 calculates a trade list by combining information from analyzing the risk of the portfolio and from analyzing the Security Analyst ratings of securities held by the portfolio and not held by the portfolio. As in the raise cash scenario, sell recommendations can be tailored to mitigate capital gains taxes. As in the spend cash scenario, buy recommendations typically spread portfolio risk over several Benchmark Categories such as Industry/Sector.

The following use case cards describe various use cases:

Use Case: Invest 122

Characteristic Information

Goal in Context: Individual investor decides to invest cash into portfolio in hopes of earning a high return on investment while minimizing transaction costs, taxes and risk.

Scope: Analysis

Preconditions: Investor has account with Portfolio Manager. Investor has a Brokerage account.

Primary Actor: Investor.

Trigger: Investor deposits cash into account.

Main Success Scenario

1. Investor deposits cash into portfolio account.

2. Portfolio Manager purchases securities on behalf of investor based on the advice of the Asset Allocator and based insecurity Analyst suggestions (Spend Cash Scenario).

Extensions

1a. Investor wants to raise cash via selling existing holdings (Raise Cash Scenario)

1a1. Portfolio Manager sells out losing position to raise specific amount of cash on the advice of the Asset Allocator and Security Analyst suggestions.

1b. Investor wants to lower overall portfolio risk by intelligently diversifying holdings (Rebalance Scenario)

1b1. Portfolio Manager suggests sells to close out losing position and buys to establish positions in Benchmark Categories that reduce overall portfolio risk based on the advice of the Asset Allocator and based on Security Analyst suggestions.

Sub-Variations

2. Portfolio Manager may sell holdings based on recommendations from Asset Allocator and Security Analyst Recommendations may be based on return on investment or tax consequences 2. Portfolio Manager may Buy Securities from a list of suggested alternates ranked by Security Analyst within a Benchmark Category.

Related Information

Priority: high

Performance Target: Within same day

Frequency: On Demand

Channel to primary actor: may be phone or electronic

Secondary Actors: Portfolio Manager, Asset Allocator, Security Analyst, Trader

Use Case: Manage Portfolios 124

Characteristic Information

Goal in Context: Maximize account return by executing trades which adjust risk rating.

Scope:

Level: Summary

Preconditions:

Success End Condition: Portfolio in balance and earning a high return for customer.

Failed End Condition: Portfolio not in balance and exposing customer to excessive risk.

Primary Actor: Portfolio Manager.

Trigger: Investor wishes to establish a position in a specific security, Investor wishes to liquidate a position, Investor wishes to mitigate tax consequences.

Main Success Scenario

1. Portfolio Manager requests Trade List from Asset Allocator.

2. Portfolio Manager selects Order from Trade List to build and Order List.

3. Portfolio Manager sends Order List to Trader to be executed.

4. Portfolio Manager listens for status on Order List and schedules a rebalance.

5. Portfolio Manager receives updated portfolio from Accounting System.

Extensions

1a. Portfolio Manager manually enters trades.

Related Information

Priority: high

Performance Target: Within same day

Frequency: Varied

Superordinate Use Case: Invest

Subordinate Use Cases: Execute Trades, Suggest Trades, Provide Account Information Channel to primary actor: electronic Secondary Actors: Trader, Accounting System, Security Analyst, Accounting System.

Channels to Secondary Actors: Electronic

Use Case: Maintain Accounts 130

Characteristic Information

Goal in Context: Maintain the current balance of the portfolio by tracking and storing detail transactions.

Scope:

Level: Summary

Preconditions: Customer has valid account in accounting system.

Success End Condition: Portfolio balance accurate at all times.

Failed End Condition: Portfolio not in balance.

Primary Actor: Accounting System.

Trigger: Activity on portfolio such as executed Orders.

Main Success Scenario

1. Broker reports all executed transactions to Portfolio Accounting System.

2. Accounting System locates correct account and applies transactions.

Extensions

1. User will manually enter portfolio balances into Accounting System

Related Information

Priority: high

Performance Target: Within same day

Frequency: Varied

Superordinate Use Case: Provide Accounting Information

Subordinate Use Cases:

Channel to primary actor: electronic

Secondary Actors: Broker

Channels to Secondary Actors: electronic

Use Case: Account for Corporate Actions 132

Characteristic Information

Goal in Context: Update portfolio information based on Corporate Actions such as Stock Splits and Stock Dividends.

Scope:

Level: Summary

Preconditions: Customer has valid account in accounting system.

Success End Condition: Corporate actions such as stock splits are applied to customer accounts.

Failed End Condition: Portfolio not in balance.

Primary Actor: Accounting System.

Trigger: Corporate action such as stock split.

Main Success Scenario

1. Corporation announces stock split for a specific Security.

2. Accounting System identifies all Accounts holding the Security.

3. All accounts containing that Security are updated accordingly.

Extensions

2a. Portfolio Manager locates Account in Accounting System manually.

3a. Portfolio Manager updates Accounts manually.

Related Information

Priority: high

Performance Target: Within same day

Frequency: Varied

Superordinate Use Case: Provide Account Information

Subordinate Use Cases:

Channel to primary actor: electronic

Secondary Actors: Broker

Channels to Secondary Actors: electronic

Use Case: Provide Account Information 126

Characteristic Information

Goal in Context: Make available account and portfolio information to Portfolio Manager.

Scope:

Level: Summary

Preconditions: Customer has valid account in accounting system.

Success End Condition: Accurate account and portfolio information made available.

Failed End Condition: In-accurate account and portfolio information made available.

Primary Actor: Accounting System.

Trigger: Portfolio Manager needs to provide accurate Portfolio Holdings to Asset Allocator.

Main Success Scenario

1. Accounting System makes Investor account to Portfolio Manager.

2. Portfolio Manager stores a copy of the Portfolio.

Extensions

Related Information

Priority: high

Performance Target: Within same day

Frequency: Varied

Superordinate Use Case: Manage Portfolios

Subordinate Use Cases: Maintain Accounts, Account for Corporate Actions

Channel to primary actor: electronic

Secondary Actors: Investor, Portfolio Manager, Portfolio

Channels to Secondary Actors: electronic

Use Case: Analyze Risk 134

Characteristic Information

Goal in Context: Identify the risk characteristic of a Portfolio

Scope:

Level: Summary

Preconditions:

Success End Condition: Risk rank all Holdings in a Portfolio and identify a summary Portfolio Risk Ranking.

Failed End Condition:

Primary Actor: Asset Allocator

Trigger: One of the three scenarios of the Invest Use Case (Raise Cash, Spend Cash, Rebalance)

Main Success Scenario

1. Identify the risk for the Benchmark Categories used by a portfolio's Benchmark. Benchmark contains the relative proportion of security valuation across various Benchmark categories such as Industry/Sector.

2. Identify individual Holding residual risk.

3. Identify Security Analyst Rating of individual holdings.

4. Combine risk rankings and security ratings for each holding.

5. Assign overall Portfolio Risk Ranking.

Extensions

Sub-Variations

Related Information

Priority: high

Performance Target: RealTime

Frequency: Varied

Superordinate Use Case: Suggest Trades

Subordinate Use Cases:

Channel to primary actor: electronic

Secondary Actors:

Channels to Secondary Actors:

Use Case: Analyze Securities 136

Characteristic Information

Goal in Context: Rate all Securities in the universe of Securities under consideration.

Scope:

Level: Summary

Preconditions:

Success End Condition: All Securities have a normalized rating.

Failed End Condition:

Primary Actor: Security Advisor

Trigger: One of the three scenarios of the Invest Use Case (Raise Cash, Spend Cash, Rebalance)

Main Success Scenario

1. Security Analyst assembles list of all securities and applies a rating based on expected return.

Extensions

1a. Ratings could be based on other criteria and can be calculated in any way.

Sub-Variations

Related Information

Priority: high

Performance Target: RealTime

Frequency: Varied

Superordinate Use Case: Suggest Trades

Subordinate Use Cases:

Channel to primary actor: electronic

Secondary Actors: Security

Channels to Secondary Actors: Electronic

Use Case: Suggest Trades 128

Characteristic Information

Goal in Context: Asset Allocator creates a Trade List containing a number of suggested Trades. Suggestions are based on a combination of Risk Ranking and Security Ratings.

Scope:

Level: Summary

Preconditions:

Success End Condition:

Failed End Condition:

Primary Actor: Asset Allocator

Trigger: One of the three scenarios of the Invest Use Case (Raise Cash, Spend Cash, Rebalance)

Main Success Scenario

1. Asset Allocator assembles a list of suggested Trades based on the specific Invest Scenario.

Extensions

1a. For the Raise Cash scenario, the Asset Allocator would suggest selling the lowest rated securities, which will reduce the overall Portfolio risk.

1b. For the Spend Cash scenario, the Asset Allocator would suggest buying highly rated securities, which will also improve the Portfolio's overall risk.

1c. For the Rebalance scenario, the Asset Allocator would suggest selling lower rated securities and buying higher rated securities while improving overall portfolio risk.

Sub-Variations

1a. The Raise Cash and Rebalance scenarios may also use a tax harvesting criteria for selecting which Holdings to sell.

Related Information

Priority: high

Performance Target: RealTime

Frequency: Varied

Superordinate Use Case: Manage Portfolios

Subordinate Use Cases: Analyze Risk, Analyze Securities

Channel to primary actor: electronic

Secondary Actors: Portfolio Manager, Holding, Portfolio

Channels to Secondary Actors: Electronic

Use Case: Execute Orders 138

Characteristic Information

Goal in Context: Trader accepts the Order List from the Portfolio Manager and submits the Orders to a Broker for execution.

Scope:

Level: Summary

Preconditions: Investor has account with Broker.

Success End Condition: Trades completed and status returned to Portfolio Manager.

Failed End Condition:

Primary Actor: Trader

Trigger: Portfolio Manager signals to the Trader to execute the Orders in the Order List.

Main Success Scenario

1. Trader receives Order list from Portfolio Manager.

2. Trader possibly sets limit prices.

3. Trader submits Order List to broker.

4. Trader receives Order execution or cancellation and passes status back to Portfolio Manager.

Extensions

Sub-Variations

Related Information

Priority: high

Performance Target: Within same day

Frequency: Varied

Superordinate Use Case: Manage Portfolios

Subordinate Use Cases:

Channel to primary actor: may be phone or electronic

Secondary Actors: Portfolio Manager, Broker, Accounting System

Channels to Secondary Actors: may be phone or electronic

Use Case: Analyze Tax Lots 140

Characteristic Information

Goal in Context: Minimize the tax consequences of capital gains associated with selling a holding.

Scope:

Level: Summary

Preconditions:

Success End Condition: Tax lots with lowest returns are suggested to be sold first.

Failed End Condition:

Primary Actor: Tax Advisor

Trigger: One of the three scenarios of the Invest Use Case (Raise Cash, Spend Cash, Rebalance)

Main Success Scenario

1. Sell suggestions consist of specific tax lots which will help reduce the overall tax burden.

Related Information

Priority: high

Performance Target: RealTime

Frequency: Varied

Superordinate Use Case: Suggest Trades

Channel to primary actor: electronic

Secondary Actors: Channels to Secondary Actors: Electronic

Figure 2B:
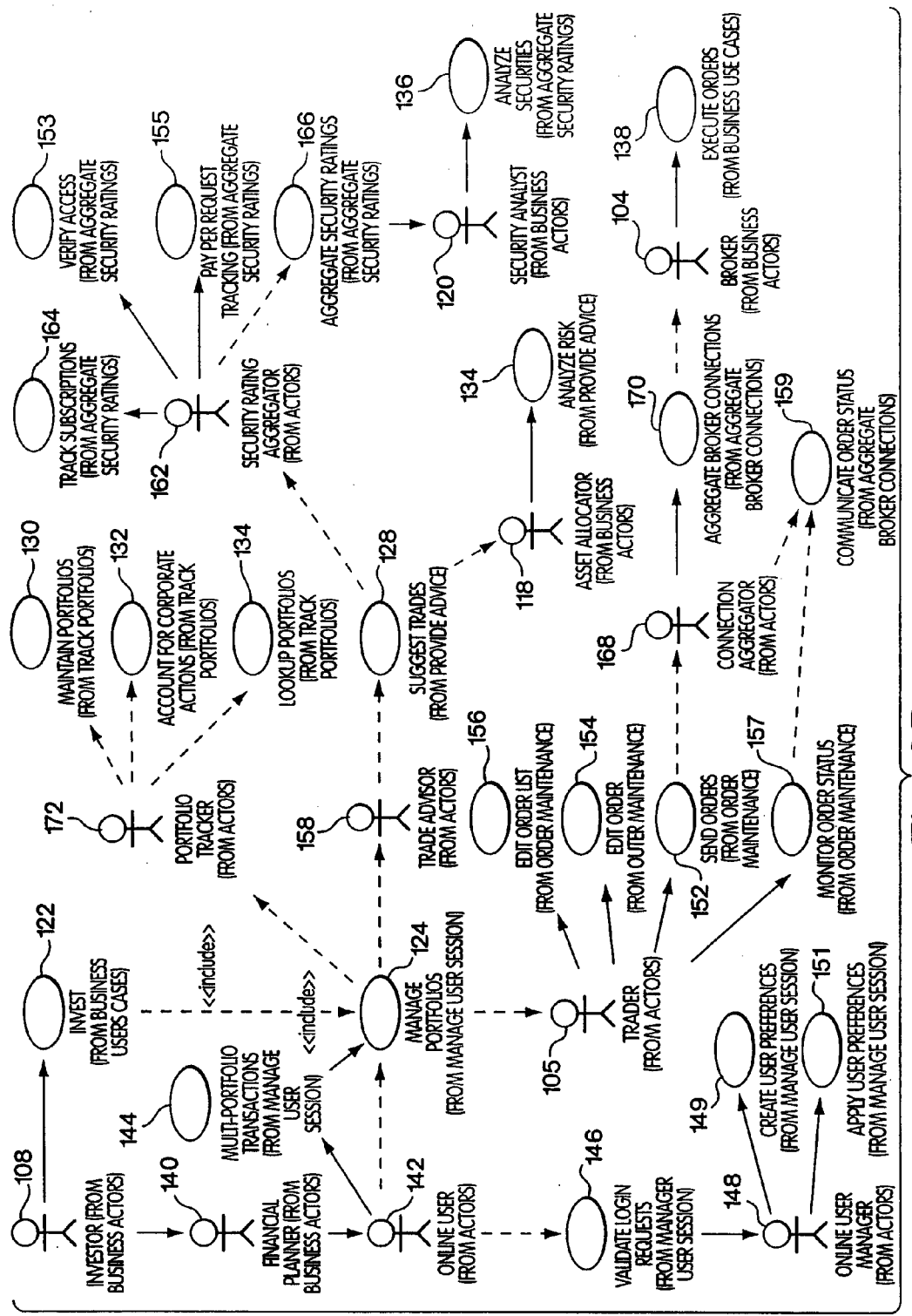
FIG. 2B is a general use case diagram for the investment advice system embodiment of FIG. 1.

The detail use case diagram of FIG. 2B is a multi-level diagram that elaborates on the business use case diagram of FIG. 2A. The first level shows an investor 108 that invests 122. The investor 108 is an actor that interacts with the system. The oval is a use case, which identifies the activity performed. An arrow pointing from a use case to an actor indicates that an actor has a responsibility to carry out at least a portion of the use case.

Thus, an investor 108 initiates investing 122. An investor could either be a financial planner 140 and/or an online user 142. Thus, the present invention contemplates serving a variety of users including a traditional financial planner managing people's assets an individual investor. Regardless of the identity of the online user, the online user 142 manages portfolios 124. Managing portfolios 124 is the primary use case.

The manage portfolios use case assigns the responsibility of tracking portfolios to a portfolio tracker 172. To manage portfolios, the system has to be able to keep track of portfolios. In fulfilling the tracking portfolio responsibility, the portfolio tracker maintains portfolios 130, accounts for corporate actions 132, and looks up portfolios 134.

The maintain portfolios use case maintains portfolios by receiving existing portfolio data in known file formats. In one embodiment, an automated interface from a broker, allows regular, e.g., nightly, downloads that provide the system with holdings information regarding their customers. Alternatively, the maintain portfolios use case can receive new data via a manual interface, e.g., allowing a user to type in holdings. The account for corporate actions 132 can receive data feeds that provide information on stock splits and dividends to maintain accurate information regarding holdings associated with accounts. In addition, the portfolio tracker is able to provide a list of portfolios or look up a specific portfolio in response to a request from the manage portfolios use case 124.

The other main responsibility of manage portfolios 124 is to suggest trades 128. The trade advisor 158 has the responsibility of suggesting trades 128. In other words, the trade advisor suggests which stocks to buy and which holdings to sell. The trade advisor 158 can also provide alternatives to the suggested transactions.

The suggest trades use case assigns responsibility for producing analyst rankings and forecasts to the security ranking aggregator 162. The security ranking aggregator is responsible for aggregating security ratings 166 from specific security analysts 120, who in turn analyze securities 136. Security rating aggregator 162 aggregates ratings of security analysts who analyze securities. The security ranking aggregator 162 also assigns responsibility for tracking subscriptions 164.

Tracking subscriptions 164 tracks period, e.g., monthly, subscribers. Pay per request tracking 155 tracks usage by users who have opted for a pay per request fee structure. Finally, verify access 153 verifies that the user has access to the security ranking aggregator 162.

The suggest trades use case 128 assigns responsibility for analyzing risk 134 to the asset allocator 118. The asset allocator analyzes risk and identifies winning and losing securities for a given account and portfolio. Combining the risk analysis with security ranking information provided by the security ranking aggregator 162, the trade advisor 158 can suggest trades. In addition, the trade advisor 158 can provide alternative trades in the event the user does not like one or more of the suggested trades.

The asset allocator 118 can also analyze a portfolio in terms of the specific tax lots that are held by the portfolio. When making a Sell recommendation, the asset allocator 118 will suggest selling the tax lots which experienced the lowest return but greater in absolute value than a predetermined level in order to mitigate the tax consequences of capital gains.

Returning to the manage portfolios use case 124, another responsibility for managing a portfolio is to execute trades. The manage portfolios use case 124 assigns this responsibility to a trader 105. The trade advisor has suggested trades to the user, the user has selected one or more trades and submitted the trades for execution. The trader is responsible for editing the order 154, e.g., changing the size of a particular order. In addition, the trader can edit the order list 156, e.g., add or remove orders to the list. Finally, the trader 105 can send orders 152 to a broker connection aggregator 168. The connection aggregator 168 connects to multiple brokers 104. Thus, a portfolio can use multiple brokers. Thus, the connection aggregator receives order lists and aggregates broker connections 170 before sending the orders to a broker 104 for execution 138. The connection aggregator 168 monitors execution status and provides execution status back to the trader 105.

The online user 142 connects to the validate login request use case 146. This use case assigns the responsibility of creating user preferences 149 and applying user preferences 151 to the online user manager 148.

Invest and Manage Portfolios

Manage Portfolios 124 is a sub use-case of Invest 122 from the Investors 108 point of view. However, the system can achieve efficiencies by performing multi-portfolio operations. In other words, the same operation can be applied across a number of portfolios conserving computer time and resources. The sequence diagrams in FIGS. 3A and 3B, illustrate common elements of the invest 122 and manage portfolios 124 use cases.

These sequence diagrams essentially lay out the series of steps that are required to carry out the raise cash and spend cash scenarios. The steps used to carry out the rebalance scenario are similar.

Figure 3A:
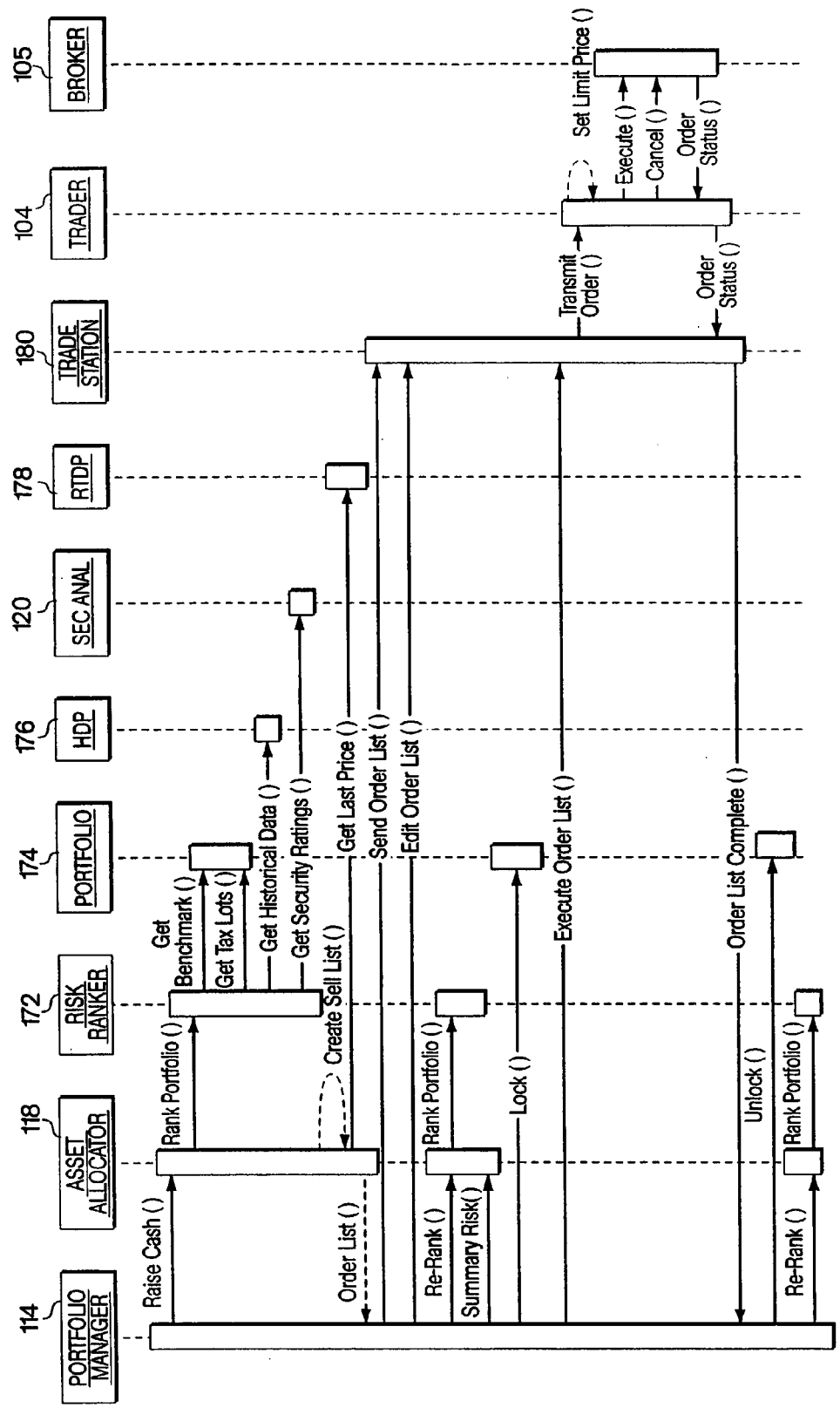
FIG. 3A is a sequence diagram for one embodiment of the raise cash scenario of the invest use case of FIG. 2B.
Figure 3B:
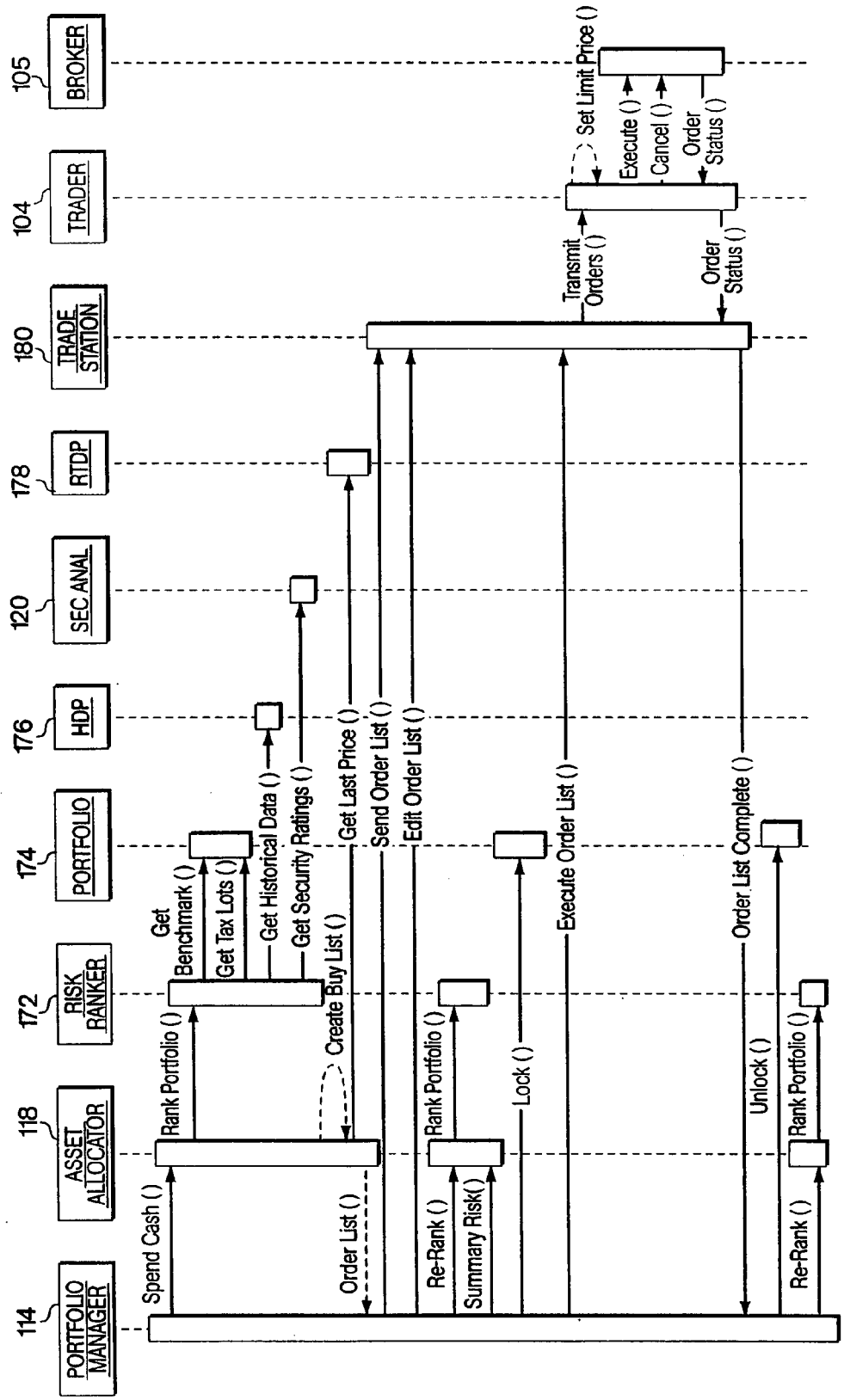
FIG. 3B is a sequence diagram for one embodiment of the spend cash scenario of the invest use case of FIG. 2B.

With reference to FIG. 3A, the portfolio manager 114 passes a raise cash value to the asset allocator 118. Asset allocator 118 passes a rank portfolio request to a risk ranker 172. The risk ranker 172 passes a get benchmark and a get tax lots request to the portfolio 174 associated with the initial spend cash request.

Tax lots include information that concerns the tax implications of trading a security. The risk ranker 172 passes a get historical data request to the historical data provider (HDP) 176. In addition, the risk ranker 172 passes a get security ratings request to the security analyst 120.

Thus, the risk ranker 172 ranks the positions in the portfolio. The risk ranker 172 also obtains a series of tax lots associated with the positions that make up the portfolio and an indication of whether those positions are good or bad to trade based on tax lot information. The risk ranker passes this information back to the asset allocator 118. The asset allocator then creates a sell list. The asset allocator 118 calls get last price to determine how many shares to sell in order to raise the user specified amount of cash.

At this point, the asset allocator 118 provides an order list to the portfolio manager 114. The portfolio manager 114 sends the order list to the trade station 180. The portfolio manager 114 is able to edit the orders within the order list. When the portfolio manager 114 makes changes to the order list, the portfolio manager 114 calls the asset allocator 118 to perform a re-rank. The asset allocator 118 then ranks the changed order list as outlined above so that the portfolio manager 114 can see whether the change improves the overall portfolio rank.

When the portfolio manager 114 executes the selected orders, the portfolio manager 114 locks the portfolio 174. The trade station 180 transmits the orders to the trader 104. The trader 104 can set a limit price. Then, the trader 104 passes an execution request to the broker 105. The trader can also send a cancel request to the broker 105. The broker 105 returns an order status to the trader 104 who in turn passes the order status to the trade station 180. The trade stations 180 passes order list complete values to the portfolio manager 114, which then unlocks the portfolio 174 and sends a re-rank call to the asset allocator 118 to pass a rank portfolio request to the risk ranker 172.

The system models system classes, responsibilities and collaborations using class-responsibility-collaboration (CRC) cards. These cards define elements of the system in terms of goals and responsibilities.

Class-Responsibility-Collaboration (CRC) Cards

With reference to FIGS. 1–3B, the following list of classes is based on analysis of the main Invest 108 use case and the related elements of the Manage Portfolios 124 use case. As noted above, the main use-case, Invest 108, is broken into three scenarios:

1) Raise Cash
2) Spend Cash
3) Rebalance

Each of the classes listed below includes a brief description of the class's purpose and a Class-Responsibility-Collaboration (CRC) Card. The CRC cards identify the responsibilities of each class and indicate which responsibilities require collaboration on the part of other classes. The CRC cards include all three scenarios. The cards use the scenario term "General" where the responsibility of the class is the same for all three scenarios. Scenario names are used to indicate where responsibilities are specific to an individual scenario.

Investor 108

The investor class represents the individual investor. Not only does this class identify the investor and his portfolios, it also carries investor preferences. This investor receives services from the system application either directly (as the end-user) or through a financial planner or portfolio manager.

| Responsibilities | Scenario | Collaborators |
| --- | --- | --- |
| Must have an account | General | Portfolio Manager |
| Must provide portfolio details Risk threshold Investment horizon Identify Buy/Sell restrictions | General | Investor Preferences Buy/Sell Restrictions Portfolio |
| Identify the amount of cash to be raised. | Raise Cash | Portfolio Manager |
| Identify the amount of cash to be spent | Spend Cash | Portfolio Manager |
| Rebalance | Rebalance | Portfolio Manager |

Portfolio Manager 114

This class represents the financial planner or person in charge of maintaining the portfolio and acting upon suggestions made by the application.

| Responsibilities | Scenario | Collaborators |
| --- | --- | --- |
| Locate Investor Account | General | Investor |
| Identify Portfolio within Account | General | Portfolio |
| Assemble and Combine Buy/Sell Restrictions | General | Investor Preferences Portfolio Manager Preferences Portfolio Preferences |
| Determine amount of cash to raise | Raise Cash | Investor |
| Determine amount of cash to spend | Spend Cash | Investor |
| Request trade list from Asset Allocator | General | Asset Allocator Trade List |
| Build Order List and send to TradeStation | General | Order List Trade List Trade Station |
| Request Alternate Security picks. | General | Asset Allocator Security Analyst Benchmark |
| Edit Trade List, which is returned from Asset Allocator. This involves selecting securities different securities to buy and sell as well as changing sizes of shares. | General | Trade List Asset Allocator TradeStation |

-continued

| Responsibilities | Scenario | Collaborators |
| --- | --- | --- |
| Request re-ranking of portfolio from Asset Allocator as trades are edited and selected. | General | Asset Allocator |
| Execute Order List. This event triggers the Order List to be sent from the Trade Station to the Trader for execution. | General | Trade Station Trade List Trader |
| Listen for Trade List completion event. When received: Update Portfolio Unlock Portfolio Schedule Portfolio Rebalance | General | TradeStation Portfolio Accounting System Portfolio Asset Allocator |

Portfolio 174

This class identifies an investor's holdings, tax lots and benchmark.

| Responsibilities | Scenario | Collaborators |
| --- | --- | --- |
| Be able to provide a list of holdings | General | Holding |
| Provide the ability to add, delete and update holdings | General | Holding Security Tax Lot |
| Provide the current value of a holding | General | Holding Real Time Data Provider |
| Ability to provide and maintain preferences | General | Portfolio Preferences |
| Provide the ability to identify and set a Benchmark | General | Benchmark |
| Identify the owner or investor | General | Investor |
| Provide two main states; locked and unlocked and be able to restrict access to read-only when locked | General | Trade Station Portfolio Manager |
| Provide the ability to sort and filter on any field of a holding including risk ranking | General | Trade Station Portfolio Manager |

Benchmark

This class identifies the industry categorizations and the category or sector weightings.

| Responsibilities | Scenario | Collaborators |
| --- | --- | --- |
| Provide percentage weights for each sector or industry category contained in benchmark | General | Real Time Data Provider Reference Data Provider |
| Provide security membership information for all securities in universe of stocks for use in constructing alternates. | General | Reference Data Provider |
| Provide Alternates for a security | General | Security Analyst, Alternate Securities List |

Security Analyst 120

Identifies single security advisor including their security ratings.

| Responsibilities | Scenario | Collaborators |
| --- | --- | --- |
| Provide ratings on individual securities | General | Security |

Security

This class identifies the properties of a single security.

| Responsibilities | Scenario | Collaborators |
|---|---|---|
| Be able to identify reference information on a particular security such as CUSIP, SEDOL, Company, etc. | General | Reference Data Provider |
| Be able to identify sector or industry category membership | General | Reference Data Provider |
| Be able to identify the last price of a particular security | General | Real Time Data Provider |

Investor Data Provider (IDP) 73

Includes interfaces to legacy systems for nightly batch updates of portfolio data.

| Responsibilities | Scenario | Collaborators |
|---|---|---|
| Provide for transmittal of investor portfolio holdings | General | Investor |

Real Time Data Provider (RTDP) 178

This class provides real-time data such as Last price for use in various calculations.

| Responsibilities | Scenario | Collaborators |
|---|---|---|
| Provide last price information for calculating current value of holdings as well as other calculations. | General | Holding Security |

Historical Data Provider 176

This class provides historical data for use in nightly batch calculations.

| Responsibilities | Scenario | Collaborators |
|---|---|---|
| Provide regular transmittal of historical data on risk and price for use in risk calculations. | General | Risk Ranker |

Reference Data Provider 177

This class provides information about securities and benchmarks such as sector membership.

| Responsibilities | Scenario | Collaborators |
|---|---|---|
| Provide information on specific securities such as CUSIP, SEDOL. | General | Security |
| Provide information for the construction of standard benchmarks such as industry codes for the S & P 500. | General | Benchmark |

Trade Station 180

Provides access to proposed trades and includes methods for managing trade list.

| Responsibilities | Scenario | Collaborators |
|---|---|---|
| Designate a Broker on each Order | General | Broker Portfolio Order |
| Pass order list to Trader when Portfolio Manager signals to execute the order list. | General | Portfolio Manager Trader |
| Monitor status of orders in order list | General | Trader |
| Send Portfolio Manager a message when Order List is complete | General | Portfolio Manager Trader |
| Monitor changes to Order List made by Portfolio Manager | General | Portfolio Manager Order List Order |

Asset Allocator 118

This class has the responsibility to communicate with the risk ranker and assemble suggestions based on specific use cases.

| Responsibilities | Scenario | Collaborators |
|---|---|---|
| Create Order List of Sell trades | Raise Cash | Portfolio |
| Pass portfolio including Benchmark to Risk Ranker | | Risk Ranker Real Time Data Provider |
| Ask Risk Ranker to deliver ranked portfolio | | |
| Use Raise Cash amount, Last Trade Price and Buy/Sell Restrictions to determine which holdings to sell | | |
| Rebalance Portfolio | Rebalance | Asset Allocator Portfolio |
| Generate Order List by applying Buy/Sell Restrictions | | |
| Provide portfolio summary ranking | General | |
| Supply Buy Side alternatives | Rebalance, Spend Cash | Security Analyst Risk Ranker |
| Create Buy List using Cash to Spend amount | Spend Cash | Risk Ranker |

Risk Ranker 172

This class delivers risk rankings for a portfolio.

| Responsibilities | Scenario | Collaborators |
|---|---|---|
| Provide rank for each holding in a portfolio | General | Portfolio Holding |
| Iterate through portfolio tax lots | | |
| Access portfolio benchmark | | Tax Lot |
| obtain security advisor rankings | | Benchmark Security Security Analyst Historical Data Provider Reference Data Provider |
| Summarize portfolio risk ranking | General | Portfolio |

Broker 105

Includes all supported broker information and interfaces to broker system.

| Responsibilities | Scenario | Collaborators |
|---|---|---|
| Receive orders from Trader and acknowledge receipt | General | Trader |
| Execute orders and notify trader when executed or canceled. | General | Trader |

Trade Template

This class identifies actions to be carried out on a group of portfolios. A potential trade template is shown in FIG. 14. A set of saved trade templates is shown in FIG. 15.

Figure 4:
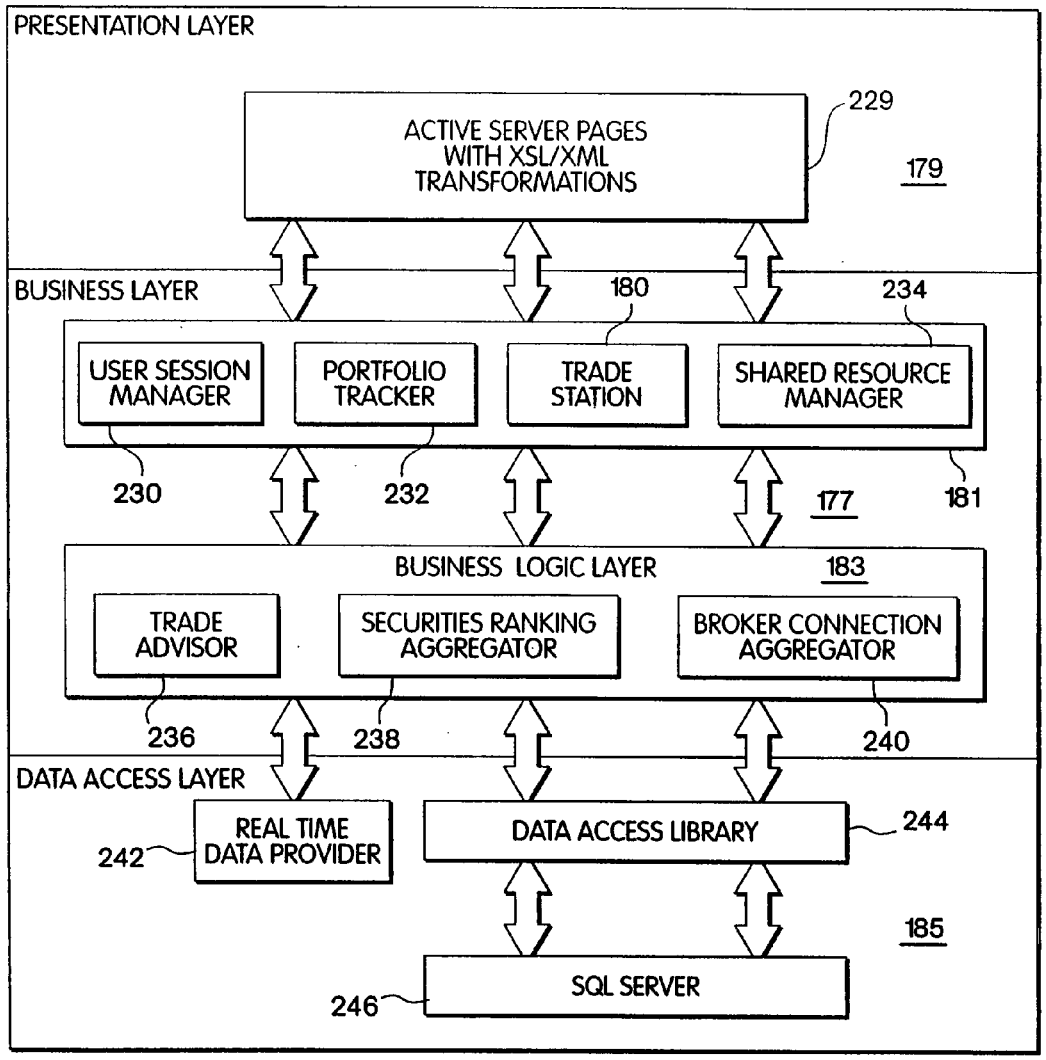
FIG. 4 shows one embodiment of the system layers for the investment advice system of FIG. 1.

FIG. 4 shows one embodiment of the system layers for the investment advices system of FIG. 1. FIG. 4 is a DNA representation of the system. This embodiment of the system software has three layers, the presentation layer 179, the business layer 177, and the data access layer 185. The layers are not necessarily on different platforms but they can be on different platforms.

In one embodiment, the presentation layer 179 and the business layer 177 are on web servers that run as part of a clustered web farm. These web servers do not store session state stored. A load-balancing server provides a front end. Thus, if a user is accessing the system from a web browser and a particular server that the user was connected to goes down, when the user hits his enter key again, the user is routed to a different functioning server.

The system can store state information in a cookie or in the HTTP request. In one embodiment, the presentation layer is run in activeX server pages (ASP). ASP is a scripting environment that allows a designer to write scripts that generate dynamic HTML pages. Other services that can be included in the presentation layer include extended style sheet language (XSL) and extended markup language (XML). The business layer 177 exposes data to the presentation layer 179 as XML. The presentation layer includes a number of ASP pages that reference XSL to transform the XML into hypertext markup language HTML.

The business layer 177 has two sublayers: the business logic layer 183, and the business services layer 181. The business logic layer 183 includes a trade advisor 236, security ratings aggregator 238 and broker connection aggregator 240. Together these components form an application service provider. These components have specified interfaces. For example, when the system calls the security rating aggregator, it receives a valid security name, and a subscription ID for validating and charging the requester.

The business services layer 181 includes emissary objects. Emissary objects form the interface between the business logic layer 183 and the presentation layer 179. Emissary objects ensure that the information being passed into the business logic layer 183 from the presentation layer 179 is accurate. Emissary objects also transform information coming out of the business logic layer 183 into a format that the presentation layer 179 can display.

The data access layer 185 has a SQL server such as Microsoft SQL server available from Microsoft Corporation of Redmond, Wash. The data access library 244 is a set of services that place a front-end on the system's data services. This provides the system with the ability to change backend database vendors without altering the application.

The interfaces between the emissary objects and the business logic layer are ADO record sets (activeX data objects). The interfaces between the business and data access layer are also ADO record sets. The interface between the data access library and the SQL server is an SQL interface such as Transact-SQL.

Use Cases for Asset Allocation

One embodiment of an asset allocation procedure according to the invention provides use cases for the significant ways that a user can interact with the system. The system can interact with a user via a user interface as shown in FIGS. 10–16.

One embodiment of the procedures provides the following data about a portfolio:
1. The percentage of the portfolio that is invested in any particular sector
2. The marginal contribution to risk associated with any individual holding, actual or proposed
3. The tax impact of selling any individual holding
4. The factor loadings of a client's portfolio, the client's selected benchmark and all securities monitored by the system One embodiment of an investment advice system according to the invention uses the procedures to detect the following undesirable situations:
1. Taking a short-term gain in a holding which will soon convert to long-term
2. Purchasing a stock that was sold within the 30 day wash period
3. Undertaking a transaction which will significantly increase the risk of the remaining portfolio
4. Purchasing a security with a low advisor rank or selling a holding with a high advisor rank.

Finally, the investment advice system can use these procedures to advise a user about potentially advantageous transactions:
1. The most advantageous way to raise cash
2. The most advantageous way to spend cash
3. The most advantageous way to rebalance The investment advice system 80 determines advantages with respect to the following information:
1. The return ranking of a stock
2. The allocation of assets across industry sectors in a relevant benchmark
3. The impact that taxes will have on potential transactions
4. Other recent buys and sells in the same stock from this portfolio
5. Exposure to specified common factors and sectors as well as concentration in a security.

While the system 80 can present this data to a user in many ways, the embodiment of the investment advice system 80 illustrated in FIG. 1 uses the following use-cases:
1. The System Harvests Losses to Offset Capital Gains In one embodiment, the application automatically displays a list of sells that have losses greater than a percent, specified in the user's profile, of their market value. The user has the option to delete these sells from the list before execution.

2. The System Rebalances Portfolio(S) to Reduce Risk and Increase the Portfolio's Stock Rankings With reference to FIG. 1, one embodiment of the system 80 computes the combined sell ranking for all stock in the portfolio. This ranking combines the negative of the return ranking, the negative of the marginal risk ranking and the negative of the % tax gain on the lot with the highest cost. The system 80 selects the stock with the most favorable sell ranking (ie. bad return ranking, bad marginal risk and high % tax loss) and sells up to 1%. The system 80 continues to examine stocks until it creates a list of sells whose value is greater than or equal to 1% of the portfolio.

Next the system 80 chooses positions with the best combined purchase rank. This ranking combines the return ranking and the marginal risk ranking. If the position was sold less than 30 days ago, then the system proceeds to the position with the next best rank. This continues until the system finds an eligible purchase. Once the system finds an eligible purchase, it creates a buy transaction. The amount of the purchase is equal to 1% of the total value of the portfolio.

At this point the system alternates between creating purchases and sales in 1% increments. Incremental purchases of the same stock may continue until the position maximum is reached.

When purchases or sales reach the point where their value is equal to the percentage of the portfolio specified by the user's profile (i.e., the maximum turnover), the system records the list of stocks to be transacted. The system then examines an additional 5% of trades to see if there are incremental transactions for any stocks in the recorded list.

The lists of buys and sells are presented to the user at this point. This list includes the number of shares to be transacted, the portfolio weight represented by the transaction, and an indication of the improvement in combined risk from this transaction. The user may elect to disregard any or all of the suggested trades by deselecting them. The user then indicates that the remaining trades are accepted.

This creates two different modes for trades on the screen. Proposed trades are those that result from the trade selection process described above while accepted trades are those that the user indicates he would like to execute. No trades leave the system for execution until the user indicates that he is through with the iterative process of trade selection. The user must then approve the final basket of trades.

3. The User Wishes to Purchase or Sell an Individual Stock

If the user wishes to purchase or sell a particular security, the user enters the security's symbol and number of units to be bought or sold in the trade blotter portion of the screen. In the case of a purchase, the system provides the combined purchase ranking and a suggested size of the purchase (which may overlap with that suggested by the user). In the case of a sale the system provides the combined sale ranking (which includes return rank, risk rank and taxes) as well as an estimate of the taxes to be paid given the users suggested trade size.

Static Computations & Data

Using a commercially available statistical package of weekly stock returns from a commercially available data base covering all relevant securities the system performs the following static computations:
 a. Calculate each security's market beta. Richard C. Grinold & Ronald N.
 Kahn, in Active Portfolio Management, Probus Publishing, Chicago, 1995, incorporated herein by reference in its entirety.
 b. Use cross sectional regression and the resulting weekly return residuals to calculate factor returns attributable to price/Earnings, price/Book, yield and market capitalization. Generate a covariance matrix of these factor returns over time.
 c. Use the resulting residual returns, capitalization weighted, and a sector beta of 1.0 to calculate the returns attributable to sector membership.
 d. The remaining residual returns are security specific and the system calculates their historical variance.

From this exercise, we derive a factor covariance matrix, factor loadings for each security and an estimate of the stocks residual standard deviation.

Normalize Advisor Forecasts

Different advisors may use different scales for their forecasts. Since the system compares and possibly combines forecasts from different advisors, the system can normalize them. The system normalizes each set of forecasts such that they have an average value of zero and a standard deviation of one. The system 80 determines a minimum (−2) and maximum (+2) standardized value. The system 80 then translates the normalized forecast into a ranking centered around the average of the worst and best rank. The system defines these forecast rankings as Forecast ranking=(worst rank+best rank)/2+Normalized forecast*(best rank−worst rank)/(max std value−min std value)

The system combines rankings from different advisors based on the estimated correlations of the rankings with one another, the assumed correlations of rankings with subsequent returns and minimum and maximum values for the relative weights of each advisor. The assumed correlations of ranking can be based on the historical correlations of rankings with returns and can be based on the system's judgment of their quality. The minimum and maximum weights may derive from the system's judgments concerning the relative importance of each source. The system solves for the weights on each set of forecast rankings using an optimization program where the system defines the covariance matrix as the covariance of the forecast rankings with one another (using estimate correlations and standard deviations to define the covariances) and the covariance of the forecast rankings with subsequent returns (using assumed correlations of forecast rankings of returns and the estimated standard deviation of returns). The system imposes a weight of −1 on the subsequent returns and solves for the weights on the forecast rankings such that the weights are between the maximum and minimum weights and such that the product of the weights and the covariance matrix is minimized.

The system creates the combined ranking as the weighted combination of the rankings from each advisor. The system rescales these rankings (as the system rescaled each advisor's forecasts above). Besides having a combined ranking for each security, the system also estimates transaction costs: defined as the security's bid ask spread plus an allowance for commission.

Computing Combined Stock Ranks

The goal of the risk rank computation is to develop a ranking which can be scaled proportionate to the forecast ranking that takes into account the stocks held in the portfolio and the investor's aversion to risk. Stocks contributing more risk when added to the portfolio have negative rankings and stocks contributing less risk have positive rankings. A combined ranking for purchases includes the forecast ranking, the risk ranking and a transaction cost ranking. A combined ranking for sales of stocks in the portfolio also includes a tax ranking. The system may choose to also show each advisor's rankings, the components of risk and the potential tax gain and transaction costs (before being translated into rankings.

Inputs include:
 The list of securities covered (Y)
 The industry list (I)
 The sector list (R)
 The sector membership list (I→R)
 The industry membership list (Y→I)
 Last night's closing price ($p_n$)

In addition, the system also requires the intermediate data computed in the static computations:
 Sector Covariance matrix ($\Omega^R$)
 Factor Covariance matrix ($\Omega^F$)
 Stock residual risk (StockResidualRisk'(y))
 Normalized forecasts (Forecast(A,y))

Also, this computation requires new values not used before:
- Risk Aversion coefficient ($C^{Risk} \cong 0.3$). This is a constant used to spread the risk ranks versus the return contribution from the advisor's forecast rankings. For risk lovers, the coefficient is small, implying that the return ranks drives the allocation decisions: for the risk averse, the coefficient is larger, implying that the system seeks safer stocks since the return rankings is dominated by the risk rankings.
- Tax (and Tcost) Weight ($C^{Tax}$). This is a constant used to balance the contribution of taxable gain. It is set on for a particular portfolio to represent the user's tax and transaction cost sensitivity.

Although the user deals with portfolio holdings as share values, the components that implement these algorithms treat them as weights. The portfolio stock weight ($\omega'_y$) is the weight of a stock in the portfolio:

$$\omega'_y = \frac{\text{shares} \times \text{price}}{\text{total portfolio value}} \quad (2.0.1)$$

This is a value between zero and one that represents the fraction value of the holding relative to the portfolio's total value. Given the current behavioral model of the application, there are three different sets of portfolio weights:
- The initial weights represent the portfolio security allocation as it is currently
- The accepted weights represent the predicted portfolio asset allocation following the execution of trades which have been accepted by the user
- The proposed weights represent the predicted portfolio asset allocation should the user accept all of the proposed trades The portfolio's total value is the sum of the values of each holding, including cash. When making the risk calculations, the system uses the active portfolio weights (portfolio minus benchmark weight) rather than just the portfolio weights.

Compute Sector Weights and Portfolio Factor Loadings

The sector weights represent the sum of the active portfolio positions in a given sector. Thus, the system can sum the weights:

$$\omega'_r = \sum_{y \in Y_r \cup Y_r^m} (\omega'_y - \omega_r^m) \quad (2.2.0)$$

The portfolio loading on a particular factor is the sum of the products of its active weight and factor value for each stock.

Compute Residual Risk

The contribution of residual risk to the portfolio's total variance is the sum of each stock's weight squared times its residual variance.

Compute Sector Risk

The contribution of sector risk to the portfolio's total variance sector rank is the product of the sector weights and the sector covariances. It is computed as: Sector Risk (y)=

$$\text{Sector Rank}(y) = \omega'_{r_1} \vec{\omega} \Omega^R \quad (2.3.0)$$

... where $\vec{\omega}$ is a vector of sector weights as $\Omega^R$ is the sector covariance matrix $r_1$ is the sector to which stock y belongs.

In scalar form, it is:

$$\text{SectorRank}(y) = \sum_{r_i \in R} \omega'_{r_1} \omega'_{r_2} \Omega^R_{r_1 r_2} \quad (2.3.1)$$

Compute Factor Risk

The factor risk contribution to the portfolio's total variance factor rank the product of the portfolio loadings and the factor covariances. It is computed as: Factor Risk(y)=

$$\text{Factor Rank}(y) = \vec{\omega}_y \Omega^R \vec{\omega}^P \quad (2.4.0)$$

... where $\Omega^R$ is the factor covariance matrix $\vec{\omega}^P$ is a vector of portfolio average values for the factors—

$$\vec{\omega}^P = \left\{ \sum_{y \in Y} \omega'_y \cdot P/E_y, \sum_{y \in Y} \omega'_y \cdot P/B_y, \cdots \sum_{y \in Y} \omega'_y \cdot \text{Yield}_y \right\}$$

In scalar form, it is:

$$\text{FactorRank}(y) = \sum_{f_1 \in F} \left( \sum_{y \in Y} \omega'_y \cdot f_{1,y} \right) \left( \sum_{f_2 \in F} f_{2,y} \cdot \Omega^F_{f_1 f_2} \right) \quad (2.4.1)$$

The portfolio variance is the sum of the residual, sector and factor variances.

Compute Portfolio Specific Marginal Risk Calculations For Each Security in the Universe Whether Held or Not Held.

For each security add a 0.1% weighting to the portfolio and calculate the corresponding change in factor, sector and residual risk divided by the change in weight. Each calculation below should be done using the active portfolio weights. The system performs these calculations by calculating revised contributions to residual, sector and factor variances, subtracting original values and dividing by the change in weight. The sum of these marginal variances is the marginal variance for each stock. If the system normalizes these marginal variances (centering them at zero and dividing through by their standard deviation), the system can create a ranking as described above for the forecast rankings (with the additional step of multiplying the risk rankings scaled between −5 and 5 by the risk constant (taking a value between 0 (not risk averse) and 1 (very risk averse)). Risky stocks receive a worst ranking while low risk stocks receive a best ranking. The system can calculate components of marginal variance (residual, sector and factor) by removing the average for each across stocks and by using the same scaling transformation as for the marginal variance.

Estimate the Percentage Tax Impact

The percentage tax impact is the percentage of the market value of the sale that will be paid in taxes. The system estimates the percentage tax impact as:

$$TaxImpact(y) = \frac{gain}{p_n \times shares} \times \begin{cases} 40\% & \text{long-term gain} \\ 20\% & \text{short-term gain} \end{cases} \quad (2.7.0)$$

The impact varies according to when the purchase of the stock took place and at what price. The system calculates this tax impact based on the most favorable tax lot. The system translates these tax impacts into tax rankings using the procedure described above for the marginal variances—with positive tax rankings associated with tax losses and negative rankings associated with tax gains.

Finally, the system translates each stocks transaction costs into a transaction cost ranking after resealing with the tax constant. The system then derives combined rankings for each stock consisting of the return ranking, risk ranking tax and transaction cost rankings.

Figure 20:
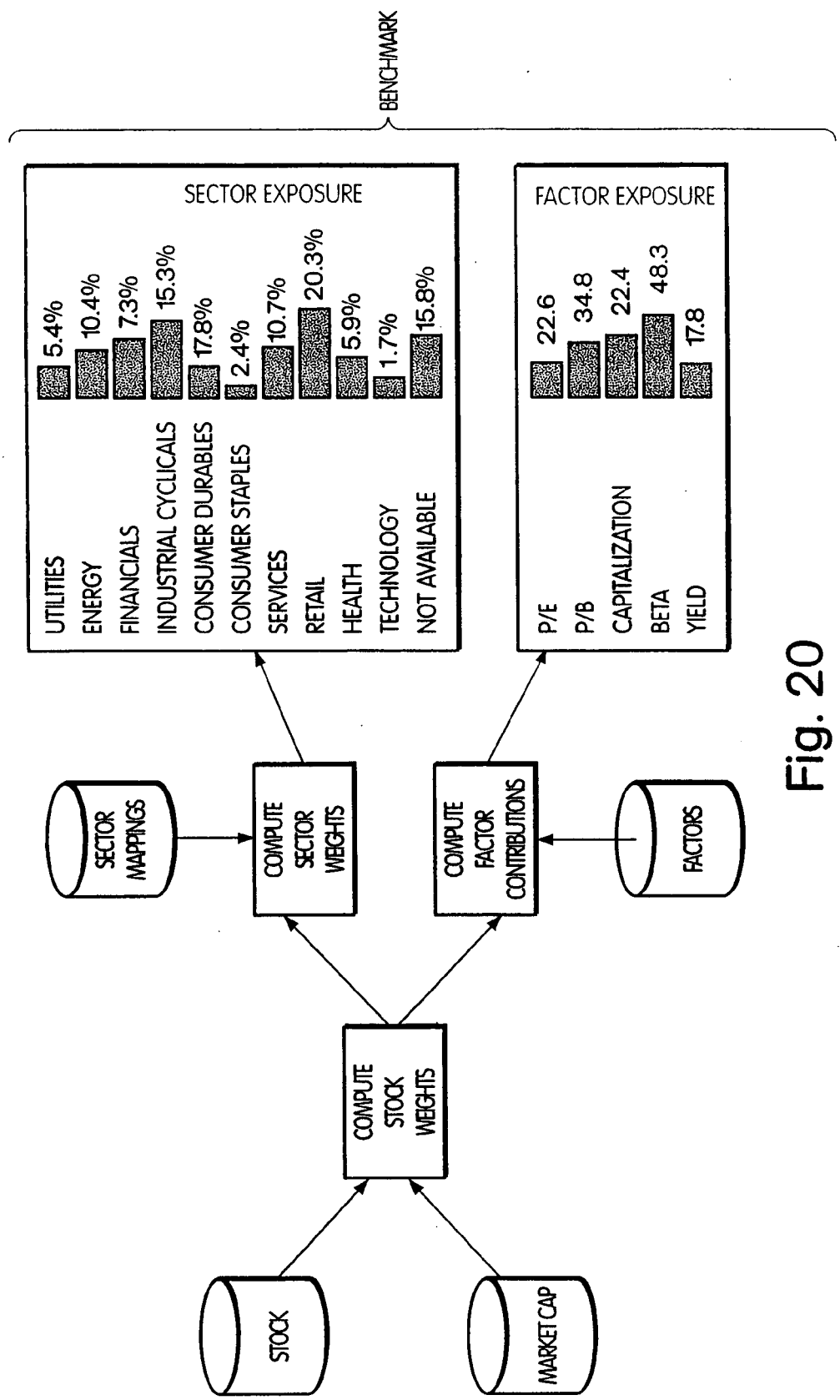
FIG. 20 is a schematic diagram of illustrating the generation of a benchmark for a securities account.

FIG. 20 is a dataflow diagram illustrating the generation of a benchmark from a set of securities—such as the S&P 500. Initially, each stock in the benchmark is weighted, step 402. Each stock's weight is calculated as the market capitalization of the stock as a percentage of the entire benchmark. In order to obtain sector exposure, the sum of all stocks in each sector is computed, step 404. In order to obtain a single factor exposure—beta for example—each stock's weight is multiplied by the stock's beta and the results of these calculations are summed, step 408. This calculation is completed for each factor, for example P/E, P/B, capitalization, Beta, and yield, to obtain the factor exposures for the benchmark. A customized benchmark can be created by selecting individual stocks comprising the benchmark rather than relying on a standard benchmark such as the S&P 500.

Performing Portfolio Risk Calculations

Figure 5:
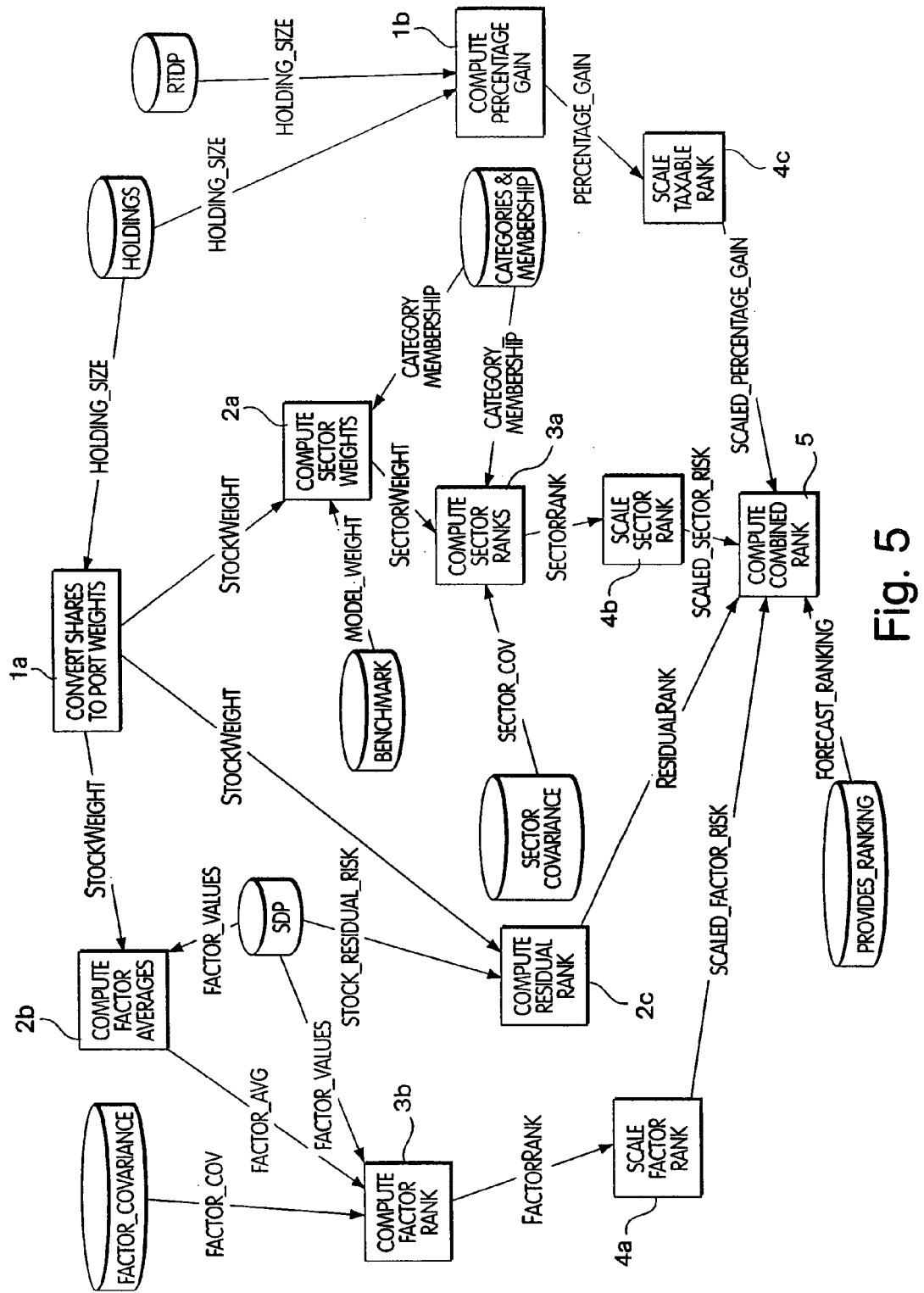
FIG. 5 is a diagram illustrating the data flow between the dynamic portfolio risk computations performed by the asset allocator of FIG. 2B.

FIG. 5 illustrates the flow of data through the dynamic calculations. The system 80 stores the results of the static computations in the database and need not be modified during the dynamic calculations. The disk symbols indicate a database or other data sources. All static data come from these database tables.

Each box represents a step in the computations documented above. Requests from the client are of the form "what trades should I do" or "how does this trade look?" Both of these requests require an up-to-date list of combined rankings for each holding in the portfolio. The system handles this request by computing step 1, i.e., steps 1a and 1b, for all holdings, then step 2 for all holdings, and so on. The number on each step indicates that step's sequence in the computation. For example, steps 2a, 2b, and 2c may be performed in parallel, but they must be performed after step 1 and before step 3.

One embodiment of the system uses a spreadsheet-type procedure to predict which values the system needs to recompute. The arrows indicate data dependencies between the computations. These arrows thus indicate what data the system needs to recomputed when a value changes. The system stores the intermediate values indicated by the labels on each arrow between boxes.

For example, assume a portfolio manager changes his model portfolio. He first logs into the system and examines the portfolio combined risk entries. This process requires all of the steps 1–5. Next, the portfolio manager modifies the model table in the database—represented above by the disk symbol labeled "benchmark." The system could then run all steps 1–5 to recompute the combined risk entries.

In order to make this scenario more efficient, the system can modify step 1 so that when the user first logs in, the system computes the stock weights and stores them in a per-user table. Then, when the system needs to recompute the combined risk based on a new benchmark, it can run only steps 2–5. The system would not need to run step one, because there is no data dependency between the portfolio benchmark and step 1—no arrow between them in the diagram.

The system can further refine the algorithm by storing the results of steps 2a and 2c in similar per-session tables called "beta_adjusted_sector_weights" and "residual_rank." Now, when the system needs to recompute the combined risk based on a new benchmark, it can run only steps 2b, 3, 4, and 5.

It is possible to further refine the algorithm to take into account data dependencies within the tables. For example, we could mark each model weight as clean or dirty. Then when the system performs the computations, could the system can limit step 3a to compute sector weights for only those sectors with new model weights.

Obtaining and Storing Portfolio Data

Obtaining Portfolio Data from Plan Sponsors

Figure 6:
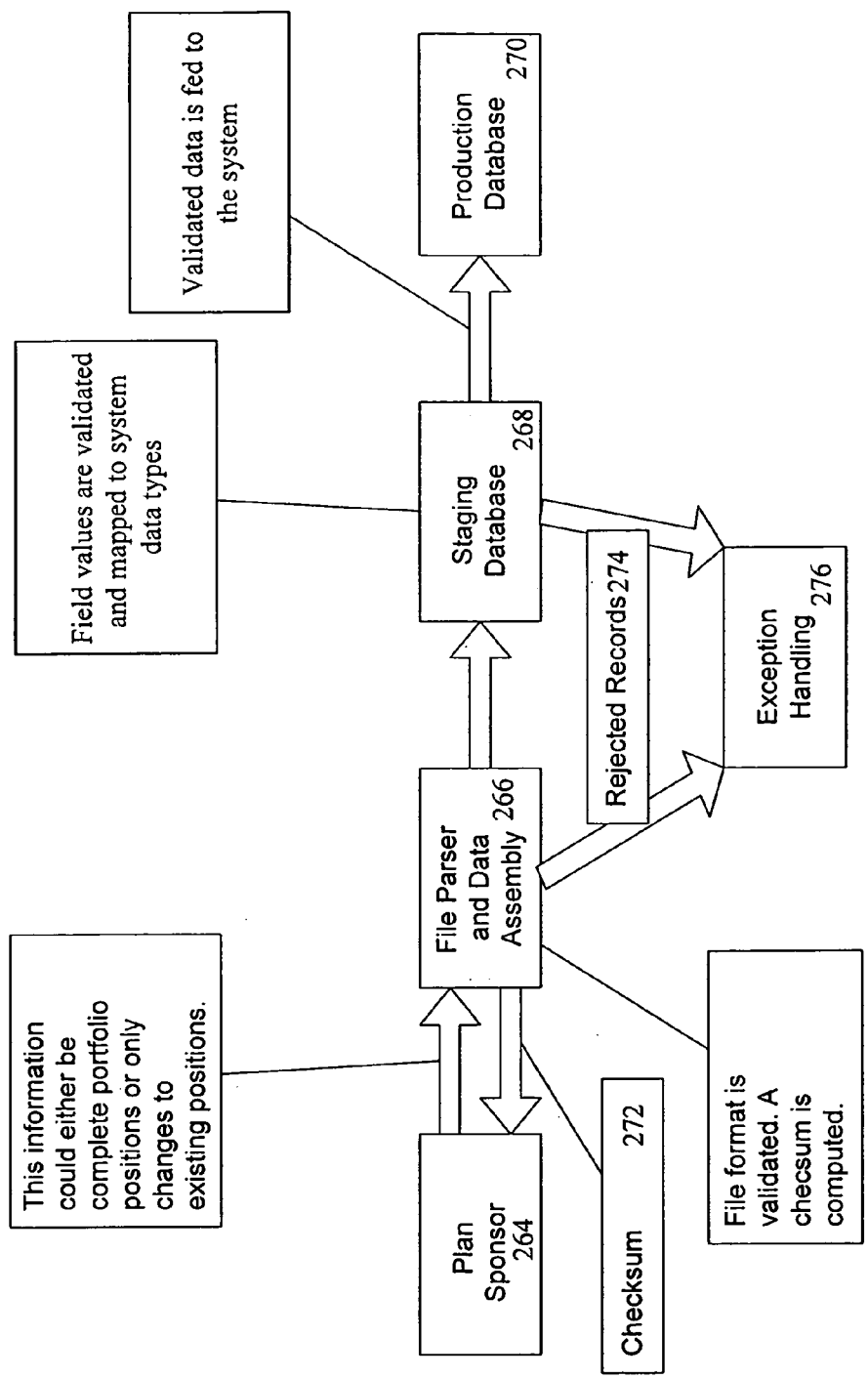
FIG. 6 is a diagram illustrating the data flow of portfolio information to and from the investment advice system of FIG. 1.

One embodiment of the system displays only up to date information on accounts. While the system applies some transactions to its database intra-day (i.e. executed trades), the portfolio manager updates system information each day to confirm the state of the portfolio as the system displays it to the customer. A dataflow of information sent to the system and the responses returned is shown in FIG. 6:

Here the file parser 266 simply parses the information and loads it into database tables which still reflect the file format received from the plan sponsor 264. When the fields are in the staging database 268, the system translates, validates, and transfers the fields to the production database 270. This helps the system to avoid the situation where the file parser 266 becomes cluttered with code that handles special parsing and translation requirements.

The file parser 266 should make COM+ calls to store each record in the staging database 268—as opposed to batch processing. The system handles intra-day updates from the plan sponsor 264. The components that translate and validate the incoming portfolio updates can be composed of COM+ objects in order to allow the system to quickly accommodate new file formats or changes in file formats without having a major impact on the system as a whole.

There are two ways that the plan sponsor 264 indicates changes in the portfolio: 1) by sending "deltas"—change transactions—or 2) by retransmitting the entire portfolio. The system typically creates new portfolios using the second mechanism, but some plan sponsors can opt to send only changes to their portfolios once the system has created a particular portfolio. The system obtains periodic refreshes of entire portfolios from the plan sponsor 264 in such cases. In one embodiment, the system allows for multiple file formats. Exception handling 276 handles rejected records 274, i.e., records rejected by the file parser 266 or the staging database 268.

Tax-Lot Data

Figure 7:
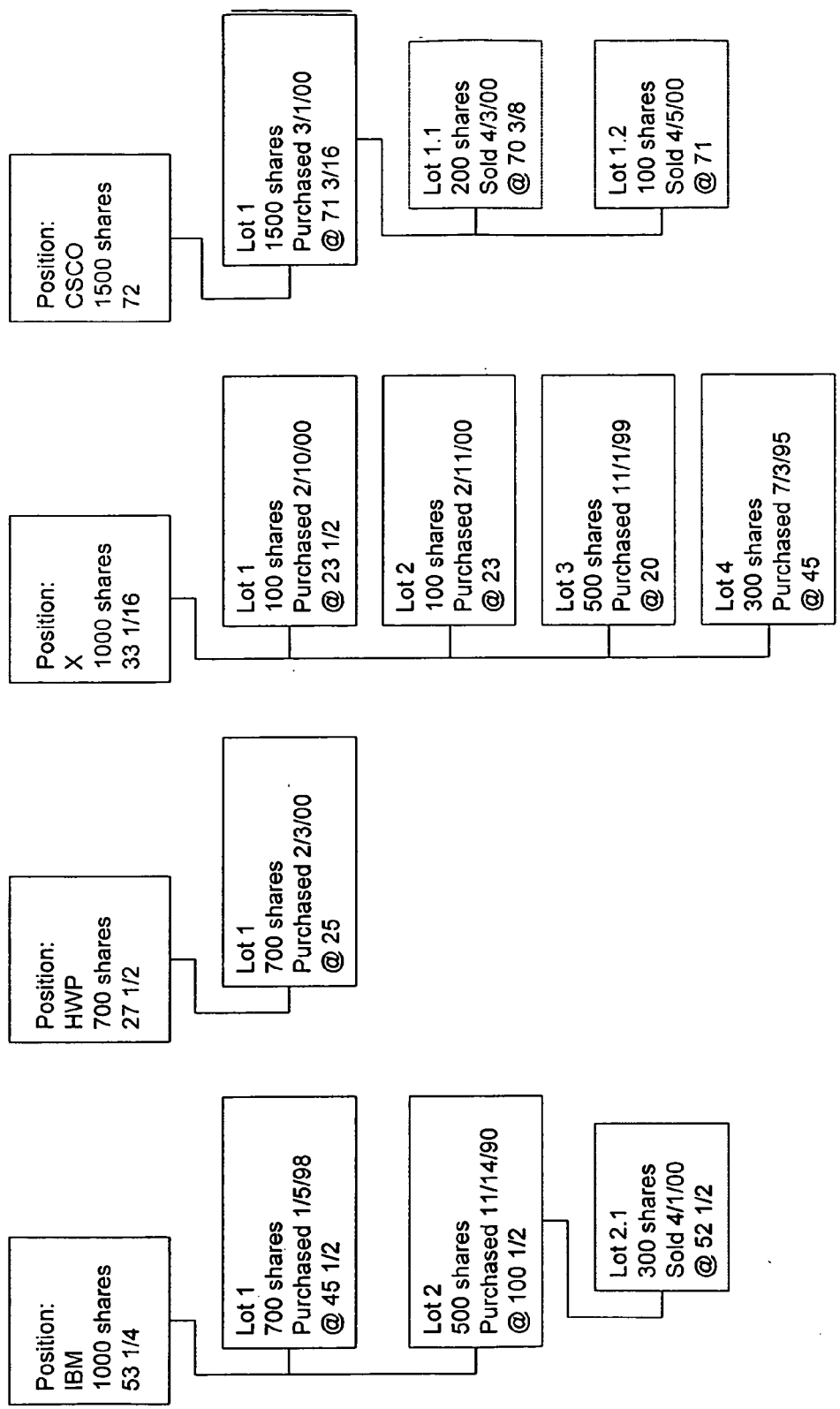
FIG. 7 is a diagram illustrating the breakdown of a portfolio into tax-lots for use by the investment advice system of FIG. 1.

In order to base recommendations on tax advantages and disadvantages, the system keeps track of portfolio positions in terms of tax-lots. The breakdown of a portfolio into tax-lots is shown in FIG. 7:

The system stores the original size of the lot. The actual size of the lot varies depending upon the number of sales linked to that block of stock. The system can maintain the actual size of the lot either by adding a field to the lot that shows the current price or by creating a view for holdings, which is a rollup of the tax lot table. If the system creates a separate field, then the system can use a trigger on the table of sales to decrement the current lot size each time a sale is added or updated.

Data Model

FIGS. 8A–8H illustrate a relational data model, which accommodates the long and medium term information used above.

Figure 8A:
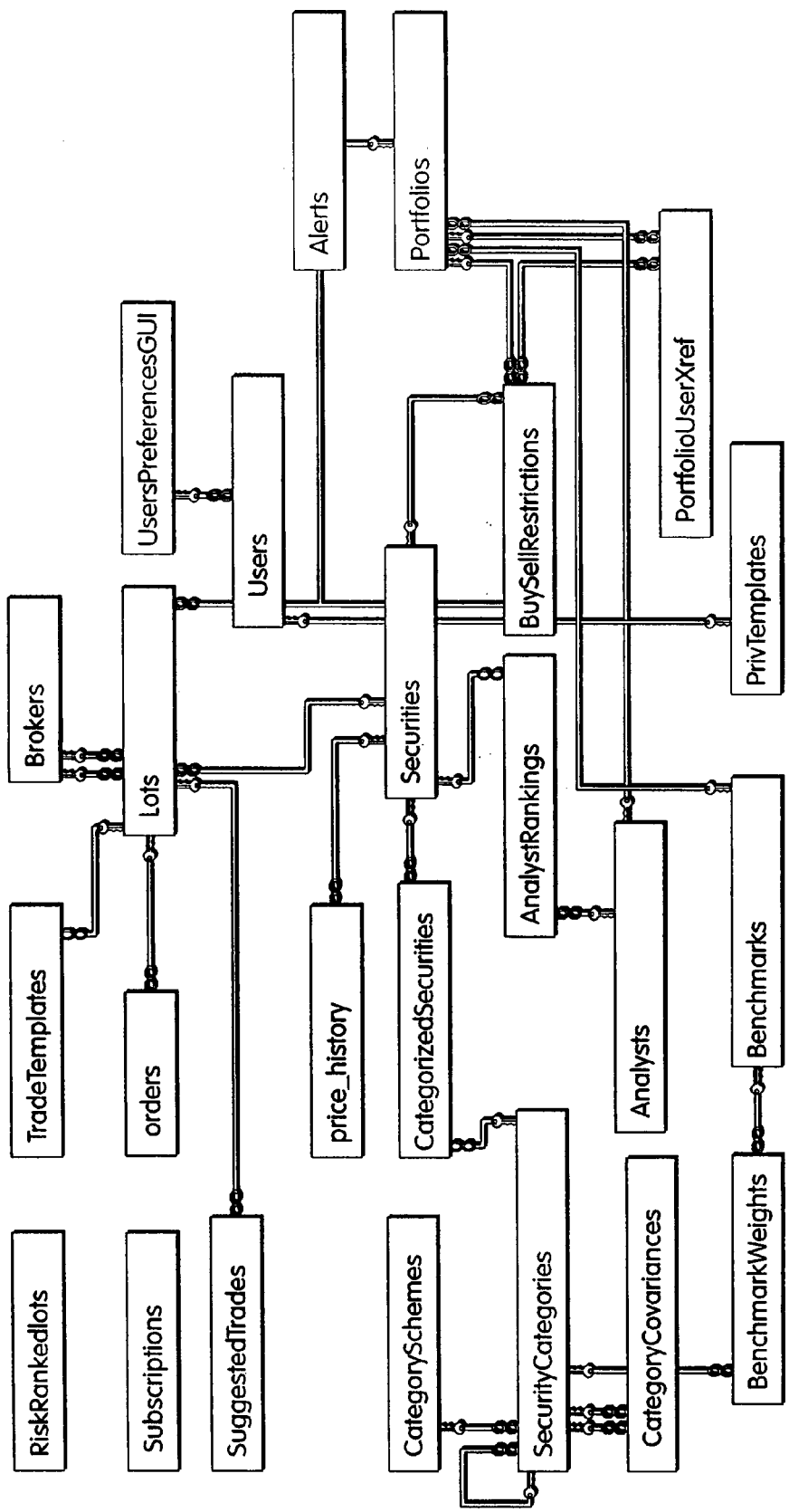
FIGS. 8A–8H are diagrams illustrating the long and medium term information used by the investment advice system of FIG. 1.

FIG. 8A provides a master view of the relational data model and illustrates the data tables comprising the data model.

Figure 8B:
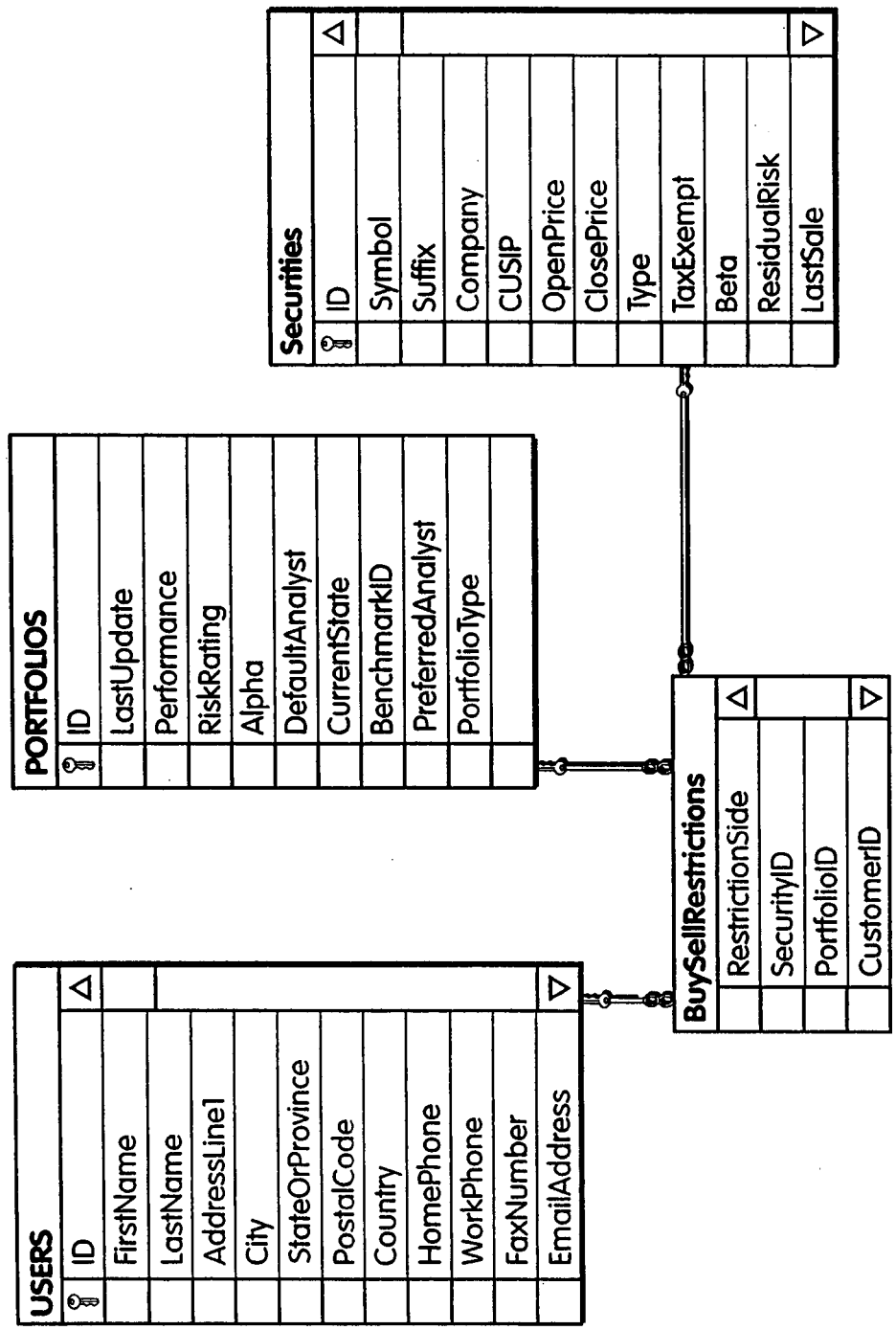

FIG. 8B provides a user view of the data tables associated with a user of the system including a Users table containing one entry for each user of the system. The user types can be for example, Advisor, Custodian, and Customer/Owner.

The User Preferences GUI Table of FIG. 8A is used to store user preferences for display of information. The Privtemplates table of FIG. 8A is used to keep track of what privileges a user has.

Figure 8C:
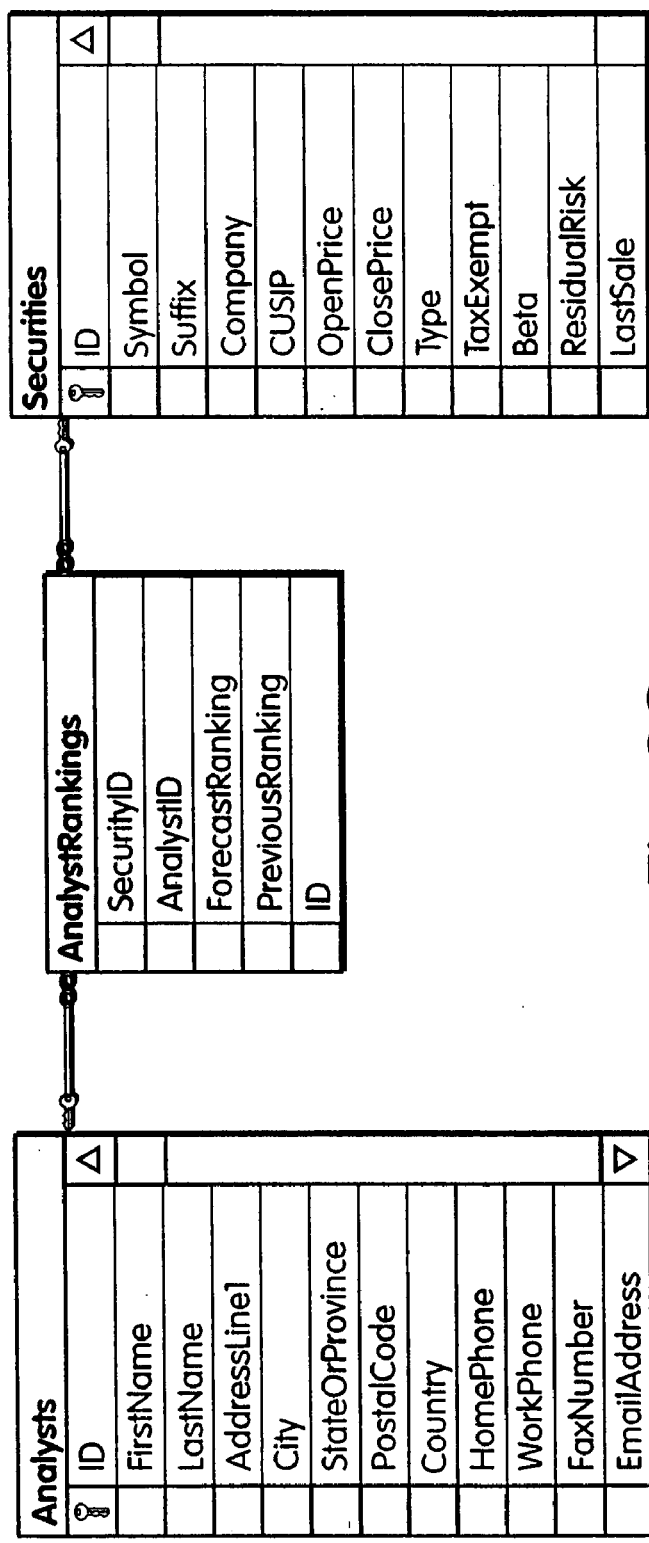
Figure 8D:
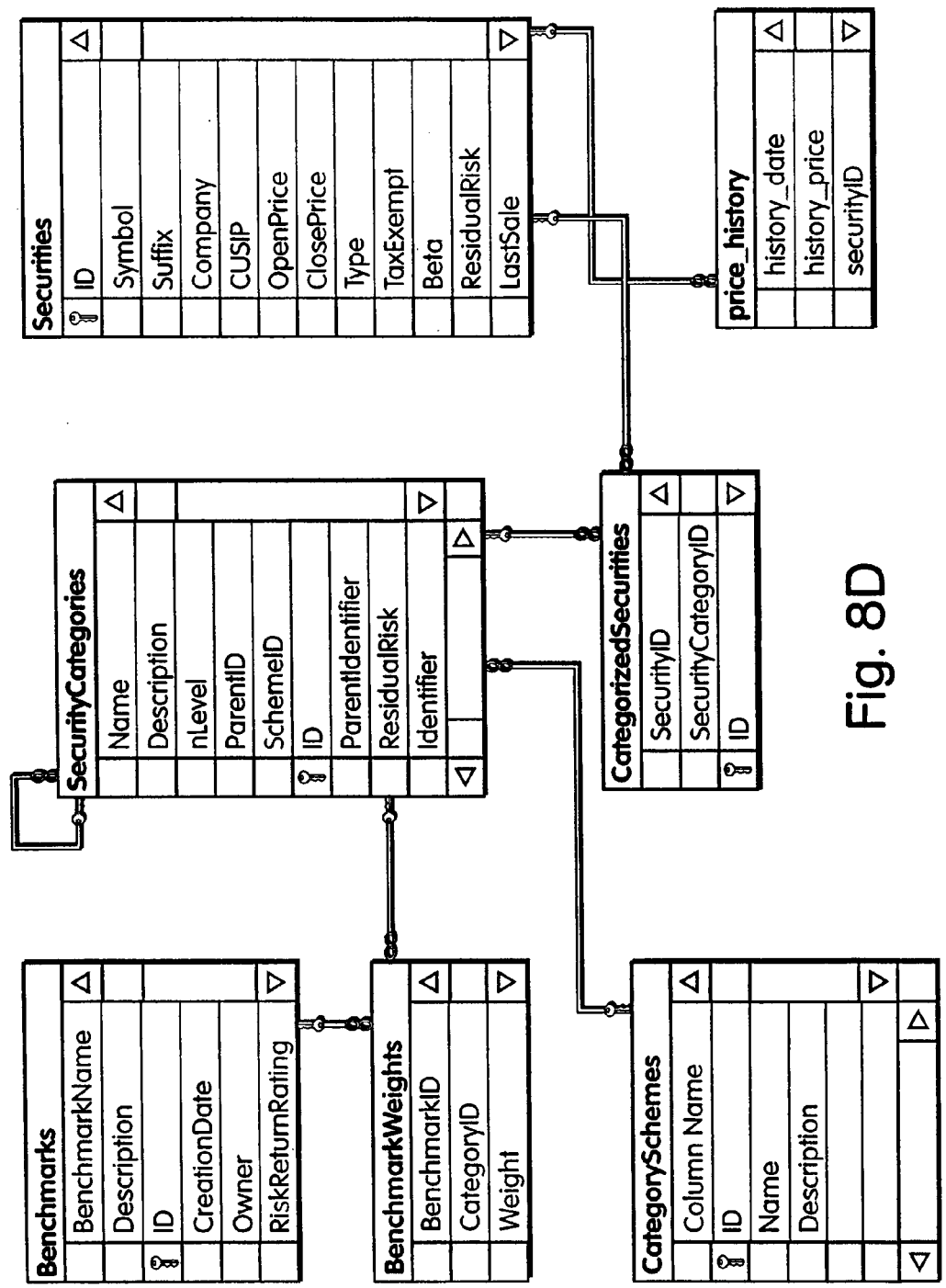

The Benchmarks table of FIG. 8D is used as a "header" record for the benchmark data. Benchmarks are used to define a target structure to measure a portfolio (actual set of holdings) against. The benchmark will include target allotments for each "sector", a reference to a sector categorization scheme (to determine which symbols comprise a particular "sector"), and target for each of the factors (P/E, market cap., etc.). The BenchmarkWeights table of FIG. 8D stores the actual sector weighting values are stored by benchmark and categorization scheme. The SecurityCategories table contains the categories to be used. It is recursive to allow for multiple levels of sub-categories. The CategorizedSecurities table is a cross reference which identifies the lowest sub-category that a symbol belongs to (within a given categorization scheme). The Securities table Contains all necessary information about a particular symbol. The PriceHistory table Stores historical pricing data for all securities. This is used to determine historical returns. The CategorySchemes table contains an entry for each category scheme. An example of a category scheme might be the S&P 500 categories.

The Analyst View of FIG. 8C includes an Analysts table containing name, address, etc. for all analysts who make recommendations. The AnalystsRankings table is used to store rankings of securities by analyst.

Figure 8E:
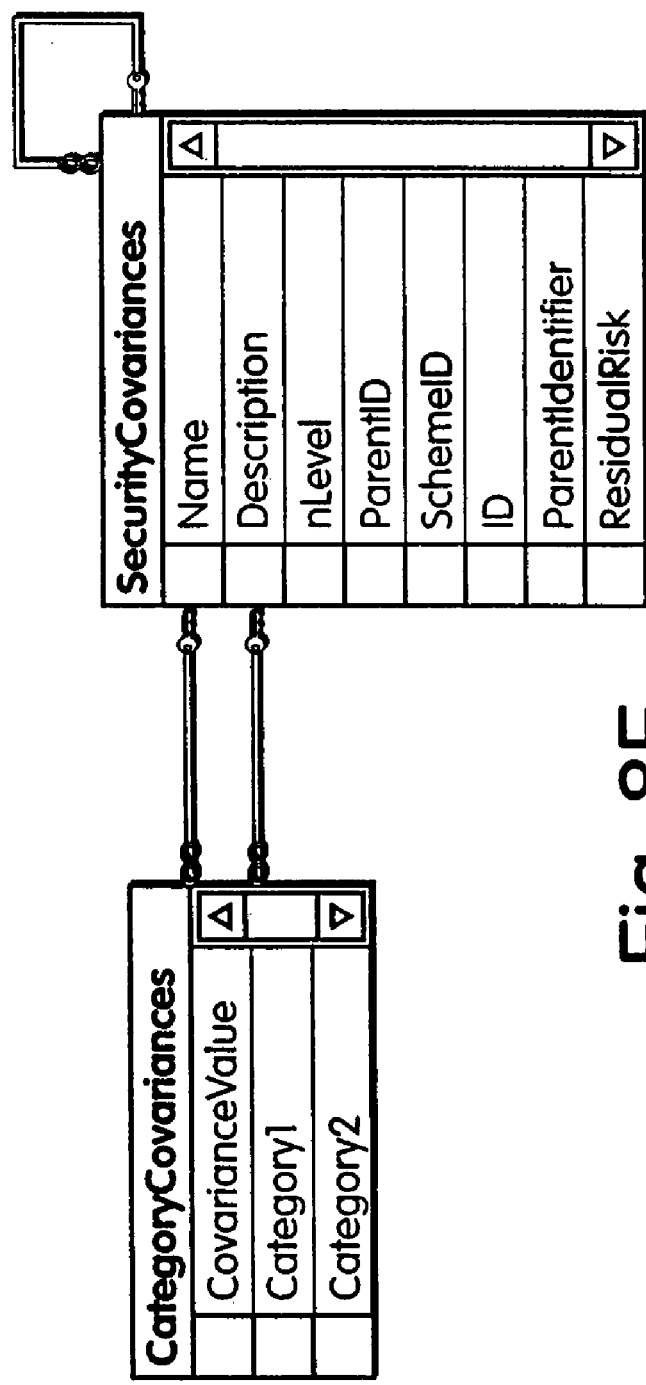
Figure 8F:
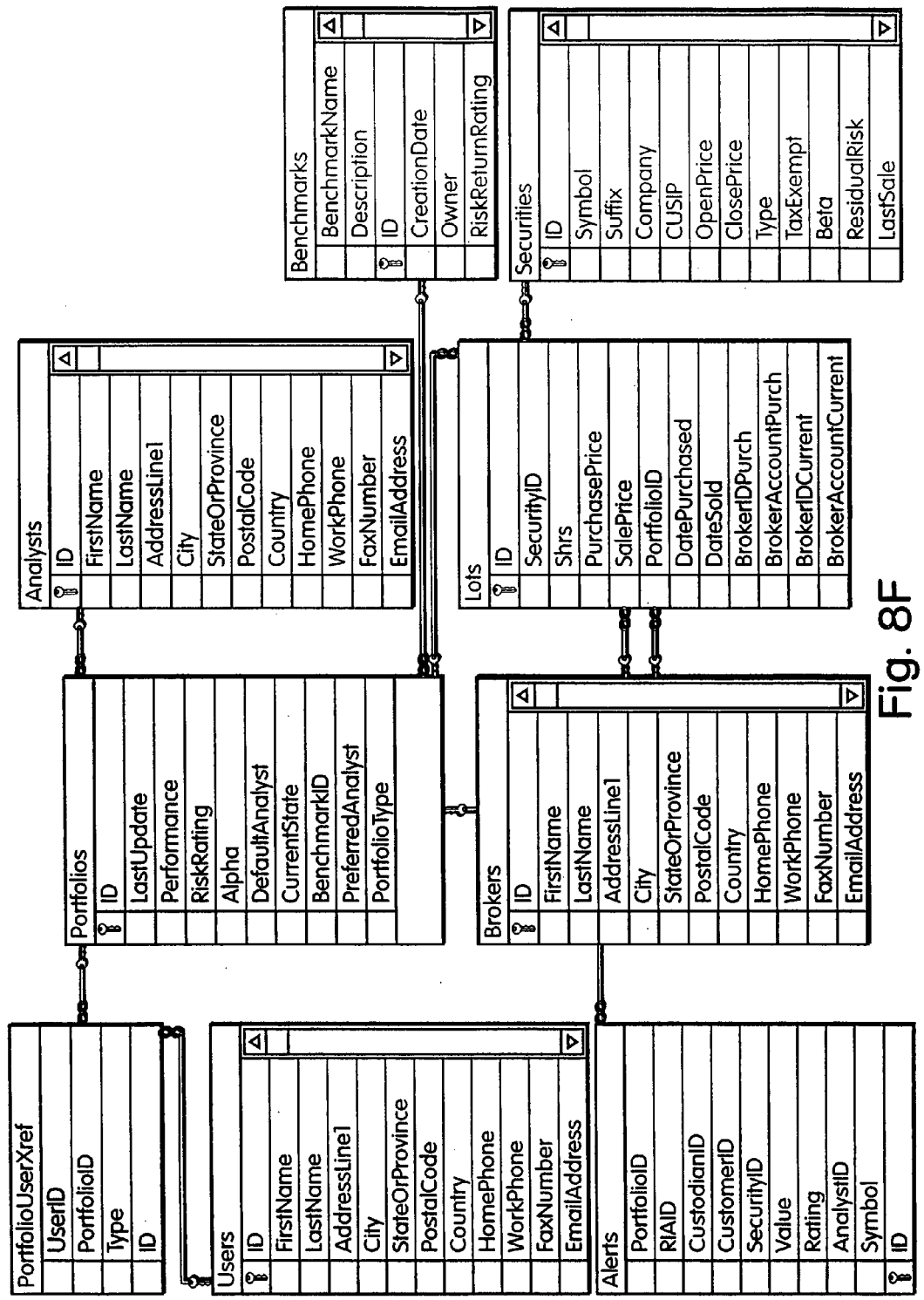
Figure 8G:
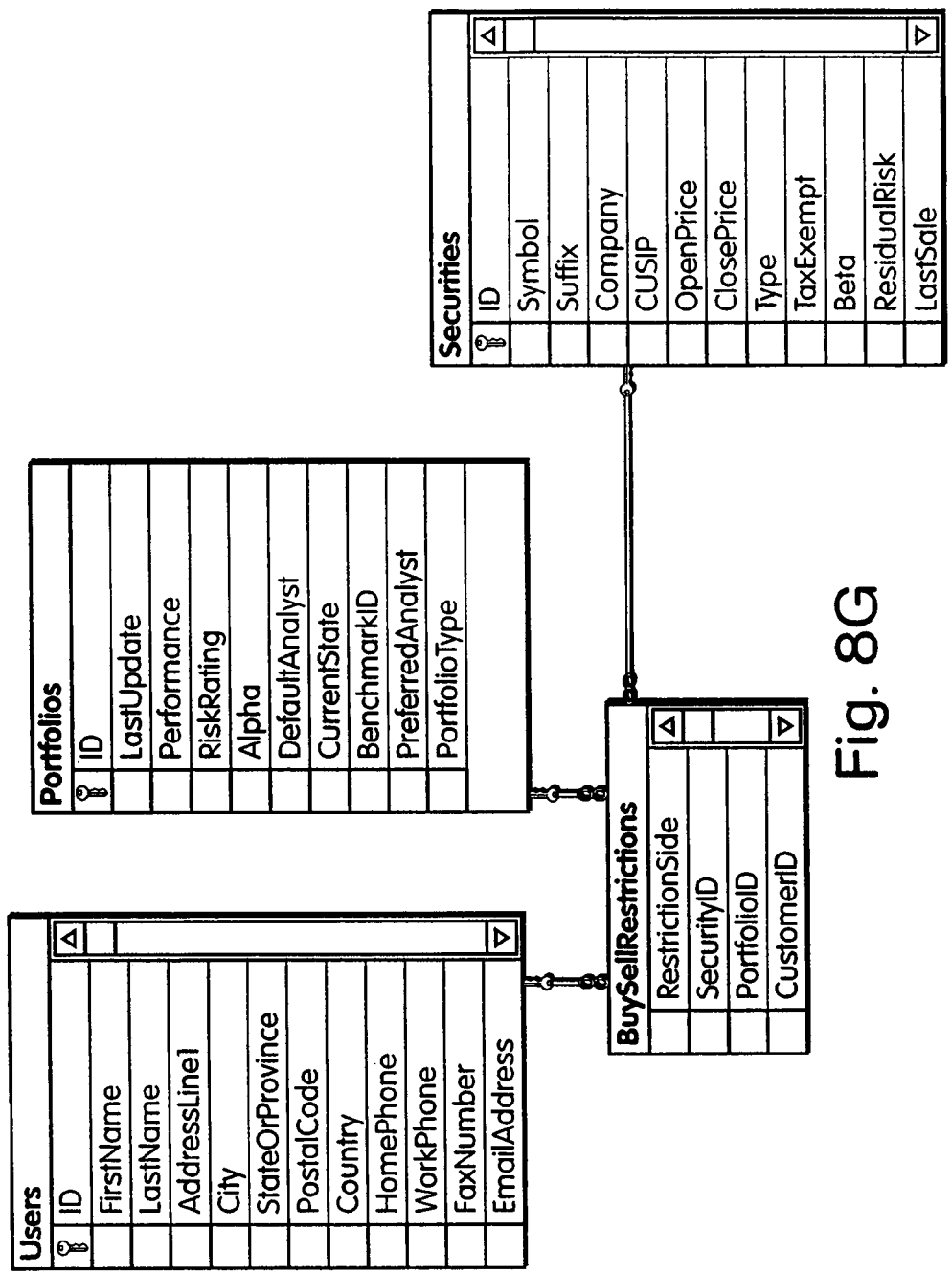
Figure 8H:
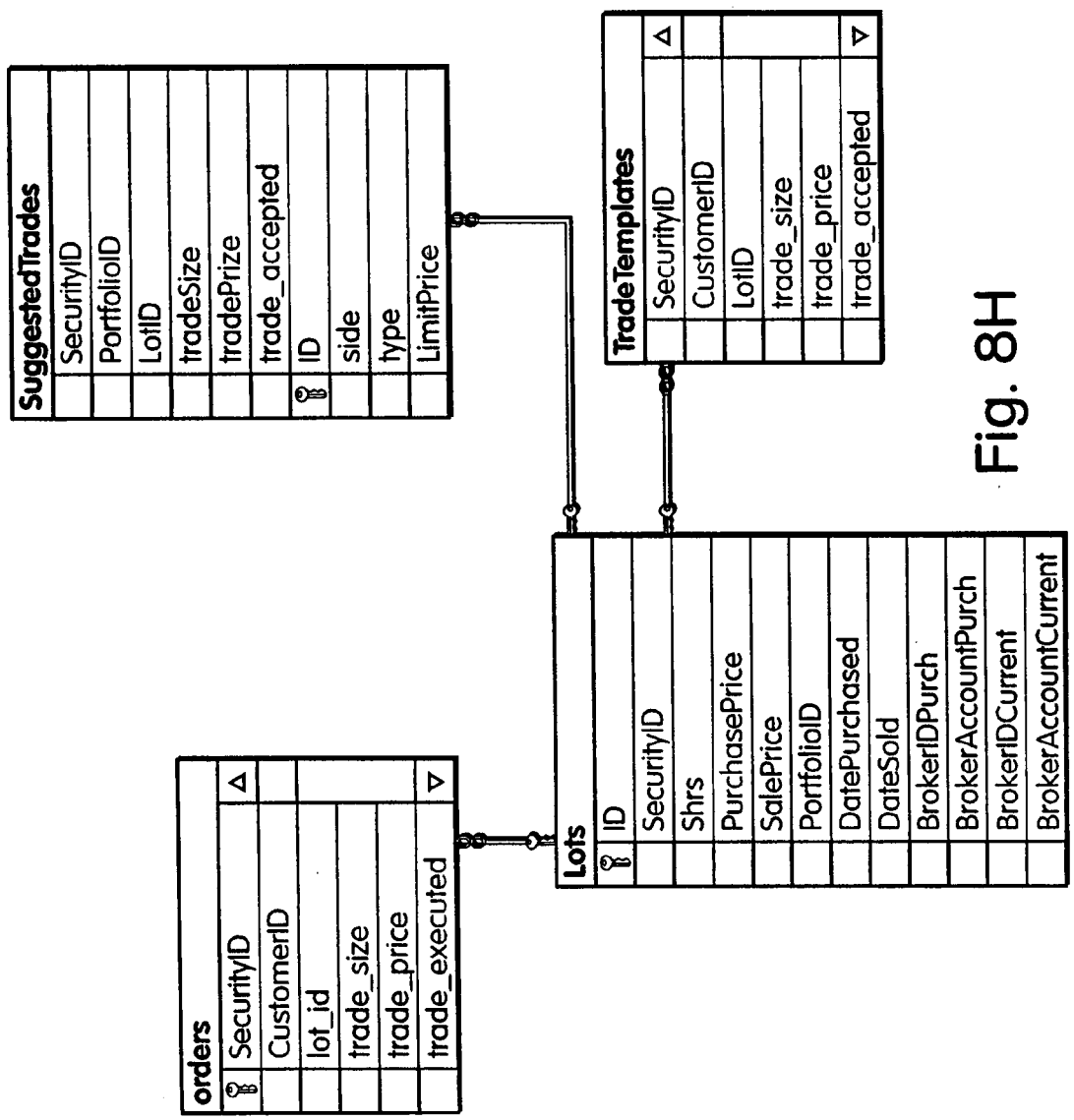

The Trades and Orders View of FIG. 8H includes a Suggested trades table that is a temporary table used to store trades suggested by the asset allocator pending user action to actually implement the trade or ignore it. The Orders table stores the orders for the trade station. When a user decides to implement a suggested trade it is moved to the orders table. The record is updated when the trade station actually makes the trade. The Trade template table is used to keep track of trades for a portfolio. It is used when an investment advisor wishes to make similar trades in a group of portfolios where he/she serves as advisor, and is provided to expedite the process.

The Portfolio View of FIG. 8F includes a Portfolios table that tracks the information about a particular portfolio. It is the "header" record for the portfolio with the detail being stored in the Lots table. The PortfolioUserXref table keeps track of which portfolios belong to which user (user type Customer), which users are custodians for a particular portfolio, and which users are advisors for a particular portfolio. The Lots table keeps track of every "lot" associated with a portfolio. Holdings are stored by lot so as to facilitate determination of which shares of a given holding should be sold first for tax consideration. The lot table is aggregated to create a "holdings" recordset when necessary. The Alerts table is used to store alerts for a particular portfolio. An alert is set when there is a news item, or when a stocks price has changed significantly and could require user intervention. The brokers table contains name, address, etc. for brokers who are authorized to transact trades which are generated.

The Buy Sell Restrictions View of FIG. 8G includes a BuySellRestrictions table storing information about trades to be restricted within a portfolio. For instance, the same symbol may not be traded twice within a 1 month period (to avoid churn). The systems also allows the user to specify symbols they do not wish to own, and/or symbols they are unwilling to sell.

The Category Covariance View of FIG. 8E includes a CategoryCovariance table that stores co-variances used in risk and allocation calculations.

There are several issues surrounding the storage of the what-if scenarios. One embodiment of the system uses a dynamic trades table that exists with the user's session. The system creates this table when the user begins a session. Trades continue to be held until either the user commits them to trade, resets the session, or ends the session.

One embodiment of a system according to the invention saves some of the dynamic data described above throughout the session as well. The portfolio weights and residual risk only change when a stock position changes. The sector weights and sector beta only change when a stock position in that sector changes. The system can compute the original values when the session starts and stores the values as the original portfolio in a table extension of the position view. When a user proposes trades, the system can read the positions and sectors that don't change from this original portfolio. This same strategy works if the system stores the accepted portfolio and reuses these values when proposing new trades. The following are examples of dynamic trades tables:

| | istock | | isector |
|---|---|---|---|
| PK | istock_username | PK | isector_username |
| PK | istock_stock_cusip | PK | isector_sector_code |
| PK | istock_portfolio | PK | isector_portfolio |
| | istock_weight | | isector_weight |
| | ristock_esidual_risk | | isector_beta |

Figure 9:
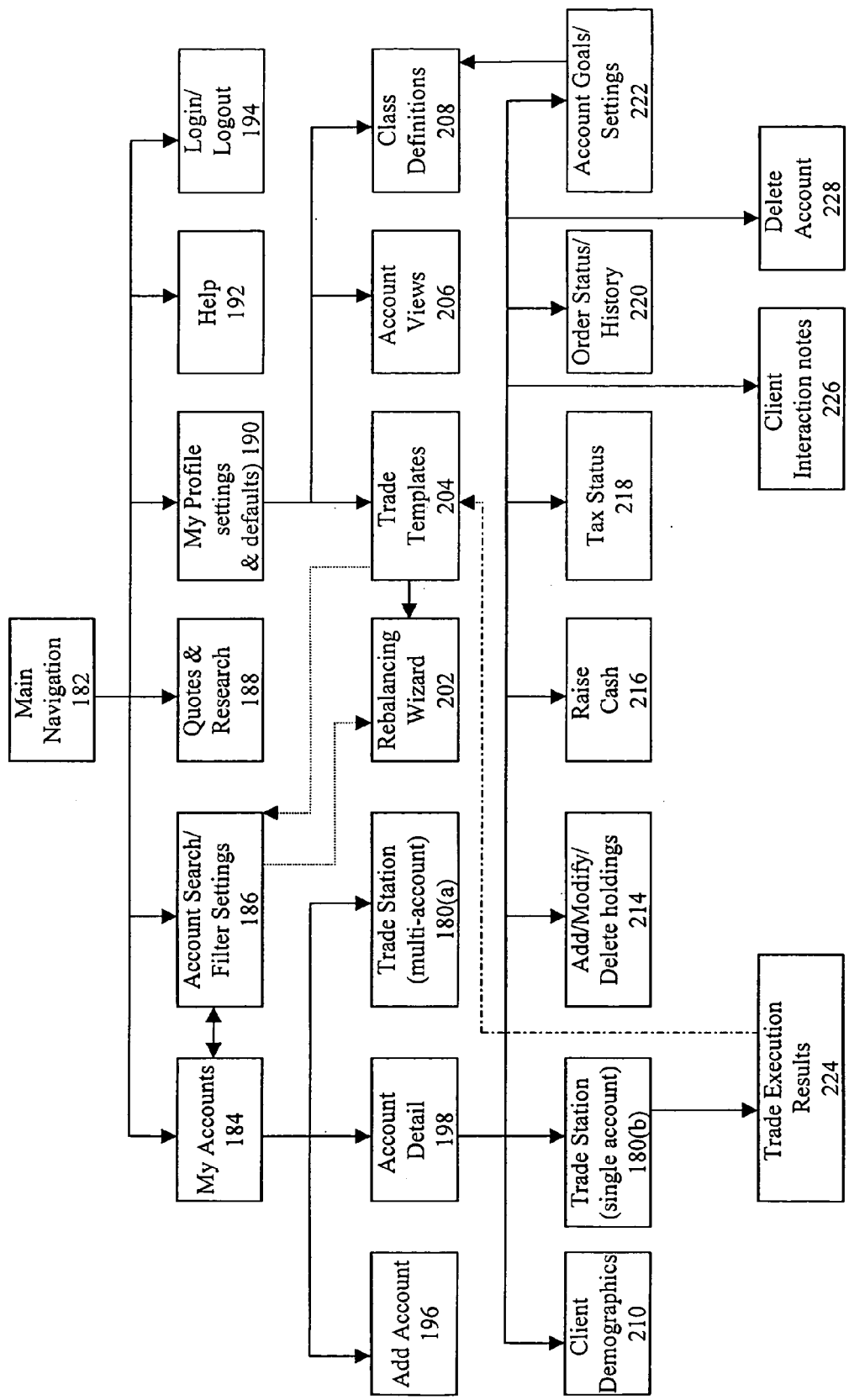
FIG. 9 is a system map for one embodiment of the investment advice system of FIG. 1.

Having described embodiments of the system in terms of system deployment, business and general use cases, CRC cards, sequence diagrams, system layers, data flows, and a relational data model, the system map of FIG. 9 relates to the operation of one embodiment of the system. This embodiment of the system is tailored for a user, e.g., a financial planner, that manages a number of accounts. For example, this embodiment allows a user to apply similar strategies to similar accounts and to interactively obtain information and advice regarding his accounts. As will be obvious to those of skill in the art, another embodiment of the system can be tailored for another type of user, e.g., an individual investor.

A user can access the system via main navigation 182. From main navigation 182 a user can access my accounts 184, account search 186, quotes & research 188, my profile 190, help 192, and login/logout 194. My accounts 184 provides a summary of the accounts the user has with the system. Account search 186 also accessible from my accounts enables the user to search out a particular account.

From my accounts 184 a user can access add account 196, account detail 198, and trade station (multi-account) 180(*a*). From account detail 198 a user can access client demographics 210, trade station (single account) 180 (*b*), add/modify/delete holdings 214, raise cash 216, tax status 218, client interaction notes 226, order status/history 220, delete account 228, and account goals/settings 222. From trade stations (single account) 180(*b*) a user can access trade templates 204. From trade templates 204 a user can access rebalancing wizard 202 and account search 186.

From account search 186 a user can access rebalancing wizard 202. From my profile a user can access trade templates 204, account views 206, and class definitions 208.

Figure 18:
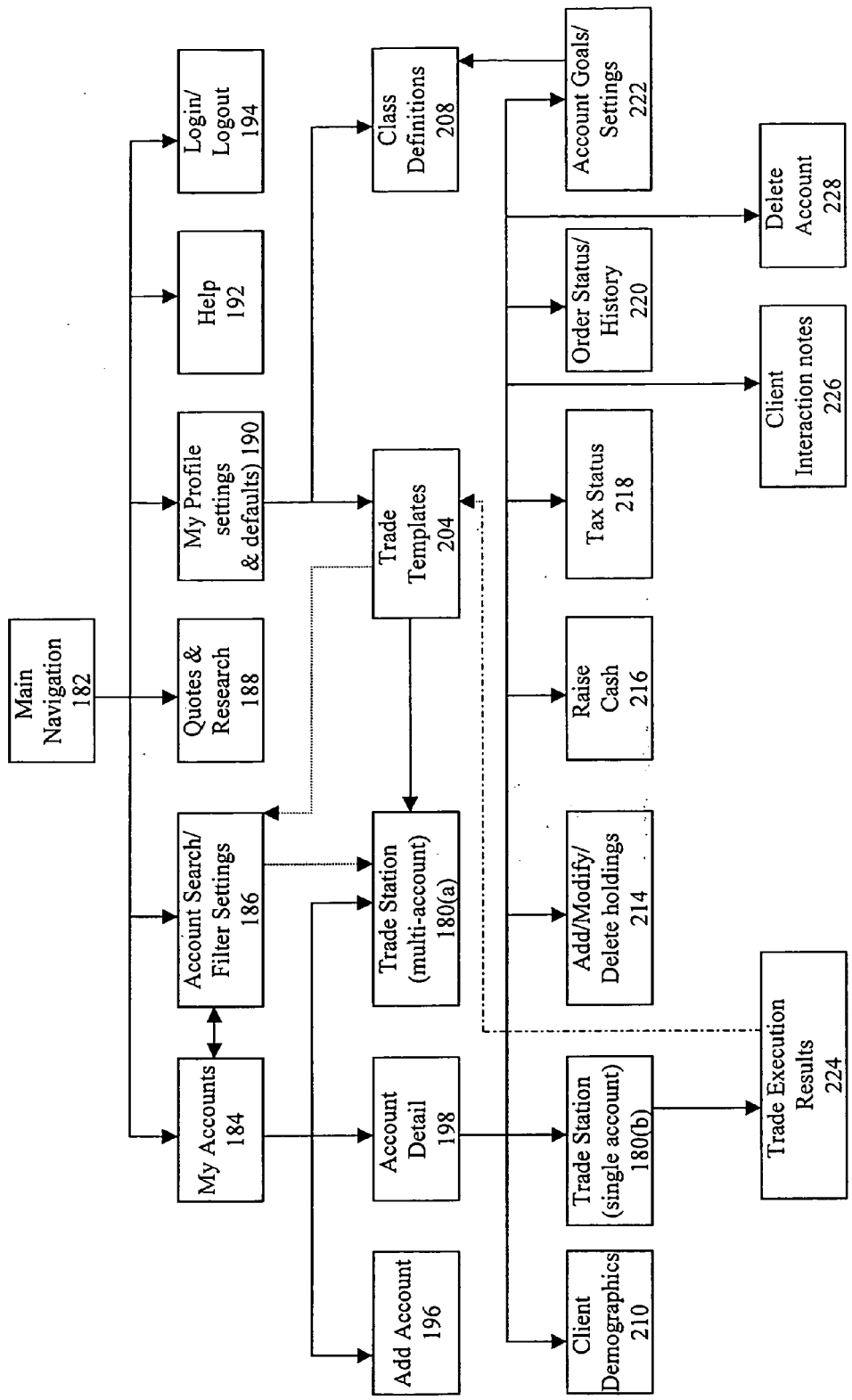
FIG. 18 shows another embodiment of a system map for the investment advice system of FIG. 1.

FIG. 18 shows an alternative embodiment of the system map. This embodiment does not include the rebalancing wizard of FIG. 9. As will be obvious to one of skill in the art, the invention contemplates a variety of system maps.

FIGS. 10–16 show embodiments of some of the elements of FIG. 9. FIG. 10 shows one embodiment of my accounts 184. This embodiment of my accounts 184 includes account list, stock alerts, and risk alerts displays. The account list display lists information about accounts that the user manages including the account name, account value, the percentage of the account that is in cash, the performance for a specified period, the benchmark, the accounts risk rating, and the accounts alpha or stock rating. The user can alter the time period over which the performance is measured, for example, by using a drop down menu. In addition, in this embodiment the user can choose to view other accounts using a drop down menu.

The stock alerts display lists information about stocks of note as selected by the trade advisor 158 of FIG. 2B. The information includes the stock rating, the number of accounts under the user's management that hold that stock, and the total value held by the accounts under management. The user can choose to take action, e.g., view the accounts that hold that stock or sell the stock from the holding accounts, based on this information. As will be obvious to those of skill in the art the stocks alert display can generalized to a display that alerts the user about securities in general.

The risk alerts display provides information about accounts with a high-risk rating. The information includes the account name and the risk rating. The user can then hyperlink immediately to the accounts in question to examine the account and take corrective action if appropriate.

Figure 11:
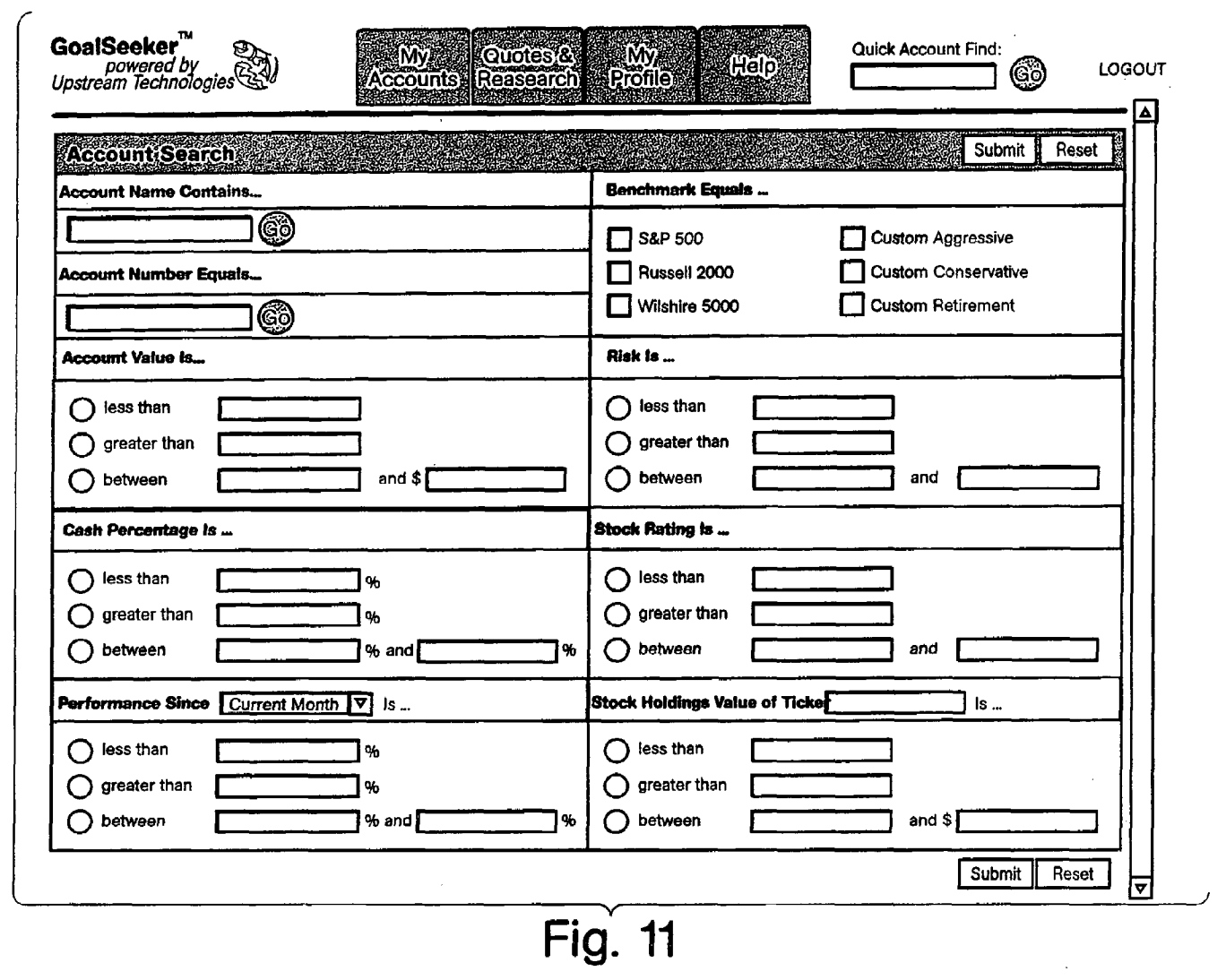

FIG. 11 shows one embodiment of account search 186. Account search 186 is a form page that allows a user to search for accounts based on one or more parameters. The parameters include words in the account name, account value, cash percentage, performance, benchmark, risk, stock rating, and stock holding value. Once the user has entered the parameters of interest, the user can submit the search and the system returns the user to my accounts listing accounts that match the search criteria.

Figure 13:
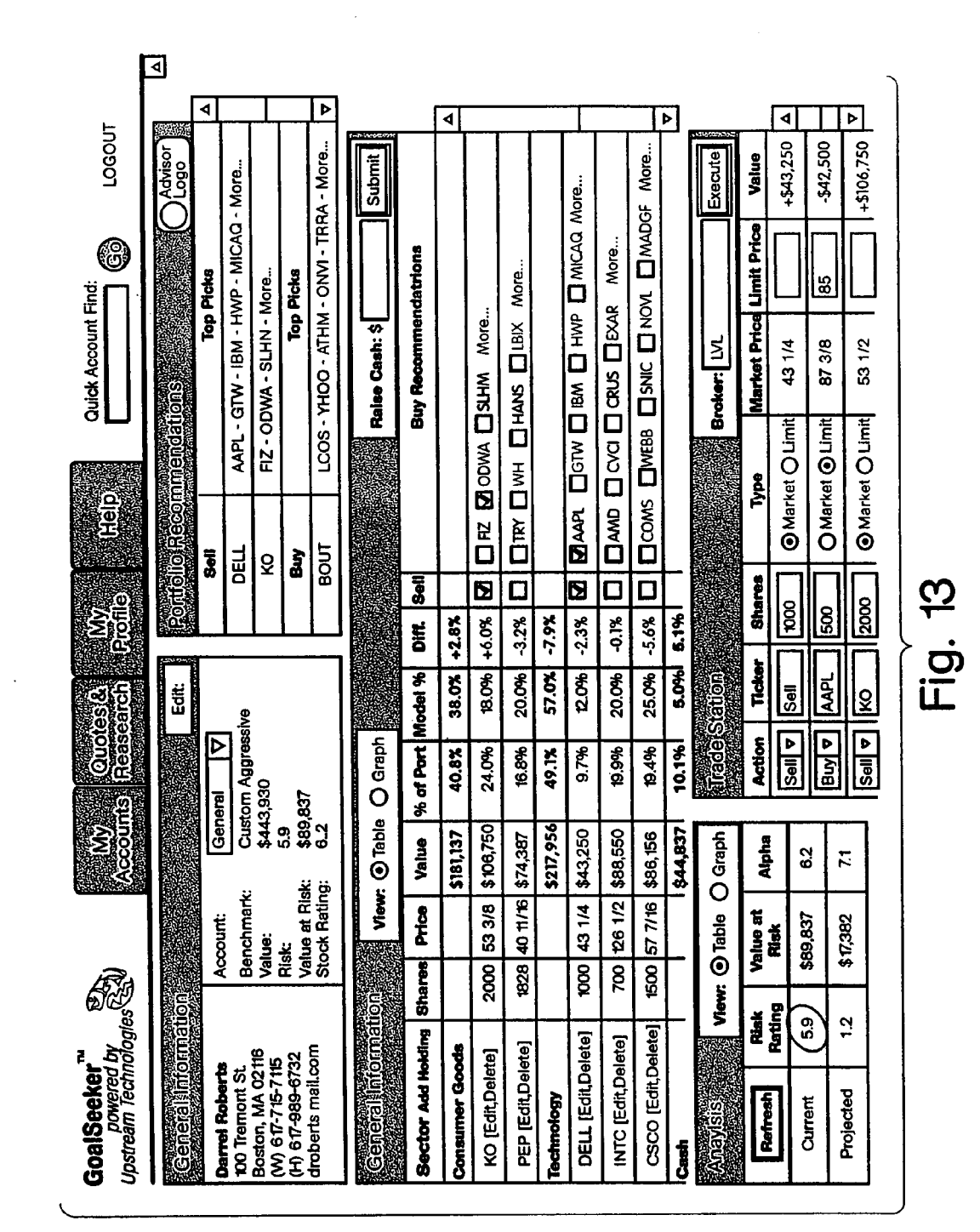

FIG. 12 shows one embodiment of account detail 198. Account detail 198 includes general information 250, holdings 254, portfolio recommendations 252, analysis 256, and trade station 258 displays. The general information display identifies general information about the selected account. The holdings 254 display provides information about the current holdings in the account's portfolio by sector. This embodiment of the holdings 254 display can display holdings in either table or graph format. Similarly, the analysis display can display the analysis in either table or graph format. FIG. 12 shows the graph formats. FIG. 13 shows the table formats. The displays of the system in general can use a variety of formats to convey information.

Screen segment General Information 250 presents the client demographic information on the left side 249 with a button that can be clicked to invoke modification of the demographic information. The right side 251 shows client risk information encapsulated by a Benchmark Portfolio, the value of the client portfolio, the tracking difference between the Benchmark Portfolio and the actual portfolio, the portfolio's value at risk and the aggregate ranking of the securities in the portfolio.

Screen segment Portfolio Recommendations 252 presents stock recommendations from the subscribed source(s). The recommendations are consistent with one another and are updated frequently; in the "Single Account Screen". The recommendations apply specifically to the client portfolio being presented. For example, sales are only recommended on securities held by the portfolio. Purchases are recommended on the top picks from the subscribed stock recommendation source.

Screen segment Holdings 254 presents the visual embodiment of the portfolio risk measures as they relate to the client portfolio on display. The underlying system provides an average risk ranking for stocks in the portfolio as well as a traditional measure of risk, the standard deviation of return over a year's horizon. The system separates this risk into components: exposure to common factors, sector exposures and individual stock concentration. All of these measures are portrayed graphically in screen segment A3 in an understandable way with the system instantiated in portfolio Rebalance Mode by default.

Rebalance Mode can best be described as a "continual improvement" mode in which the portfolio is able to present the best opportunities available given its stock recommendation subscription(s), its securities valuations, and tracking to its Benchmark.

Each securities individual concentration in the portfolio is visualized in a histogram scaled by the value it represents in the portfolio. The securities are ranked in descending order by their average risk ranking within their sector-based histogram.

For example, the Healthcare sector 262 shows securities BMY and JNJ to be the most highly ranked within that sector. Security MKG is the lowest ranked security in the Healthcare sector, which is over-exposed as illustrated by the aggregate securities value pushing above the sector's Benchmark exposure. The sector's Benchmark exposure is the percentage of the total portfolio indicated by the arrow. FUND1 shows that the client portfolio also has exposure to the Healthcare sector from owning a mutual fund.

The example shows that the whole position of MKG is recommended for a sale transaction, which following the example, would mean that if the entire position was sold, the portfolio would then be under-exposed to the Healthcare sector in relation to its Benchmark. Therefore several purchase recommendations (not shown) are provided with the sale recommendation of MKG.

The purchase recommendations are selected by default, but the client can deselect the system's recommendations to get alternative recommendations. Each of the systems checked recommendations are populated in the Trade Station, screen segment 258 to await execution.

Screen segment Analysis 256 allows the client portfolio to compare its average ranking to a portfolio after trades or to a benchmark portfolio (such as the S&P 500). By selecting and deselecting alternatives and suggestions and then by refreshing the Analysis, the client portfolio is subjected to as many "what if scenarios" prior to trade execution as the user deems beneficial.

Screen segment Trade Station 258 is populated by the system's recommendations which can be deselected by the user during the "what if" evaluation process. A broker of choice can be selected for purchase transactions; sale transactions are designated with and transmitted to the broker(s) who hold the securities on behalf of the client portfolio.

A user can capture their own view of subsequent stock performance by supplying a ranking, which overrides all other rankings and becomes the combined ranking for the stock. The system can retain the investor's over-rides subject to investor revisions in the future. This important feature is initiated from within the Trade Station 258 screen segment.

Order prices and share sizes can also be altered from the Trade Station 258 which causes the portfolio's Benchmark tracking, value at risk and aggregate stock ranking numbers to change. Once the execute button is selected, the trade list is transmitted to the broker(s) and the portfolio is locked until the transactions are released or executed by the broker.

Screen segment Raise Cash 260 inside screen segment Holdings 254 involves specifying an amount of cash for the system to raise by selling portfolio holdings. A Raise Cash instruction to the system produces a set of tailored sell recommendations to raise the indicated amount of cash, including transactions that can mitigate capital gains taxes.

Similarly, an amount of cash can be entered on behalf of the portfolio to spend buying securities. Such a Spend Cash instruction to the system produces a list of suggestions by combining information from analyzing the risk of the portfolio and from analyzing the Security Analyst ratings of securities both held by the portfolio and not held by the portfolio. Buy recommendations typically spread portfolio risk over several Benchmark Categories such as Industry/Sector and will be so graphically portrayed by the histograms of the screen segment holdings 254.

FIG. 14 shows one embodiment of trade execution results 224. Trade execution results 224 provides information about the status of the trade, the action, e.g., sell or buy, selected, the ticker symbol, shares, type, price, and value for the trade. Trade execution results allows the user to change or cancel the trade prior to completion of the trade. In addition, trade execution results 224 allows a user to name and save trade templates.

FIG. 15 shows one embodiment of trade templates 204. Trade templates 204 lists information about trade templates including name and date created. Trade templates 204 also allows a user to start the rebalancing wizard for all account with a benchmark equal to a benchmark that the user can select, e.g., from a drop down menu.

Figure 16:
FIG. 16 shows one embodiment of the "trade station" screen of FIG. 9.

FIG. 16 shows one embodiment of one embodiment of trade station (multi-account) 180(*a*). Trade station 180(*a*) includes a rebalance accounts display that provides information about various accounts including name, value, benchmark, current risk and stock rating and projected risk and stock rating. Based on this information, a user can select one or more accounts for rebalancing. The rebalance accounts also allows a user to select a trading template to apply to the selected account(s).

Figure 17A:
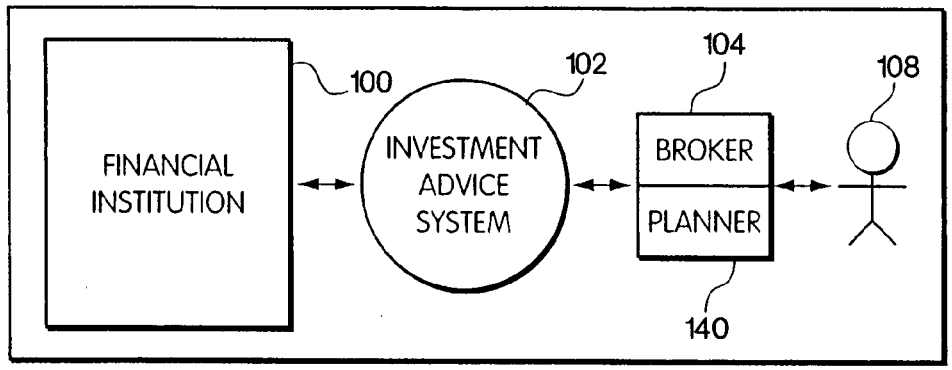
FIGS. 17A–17C illustrate three configurations for applying embodiments of the present invention.
Figure 17B:
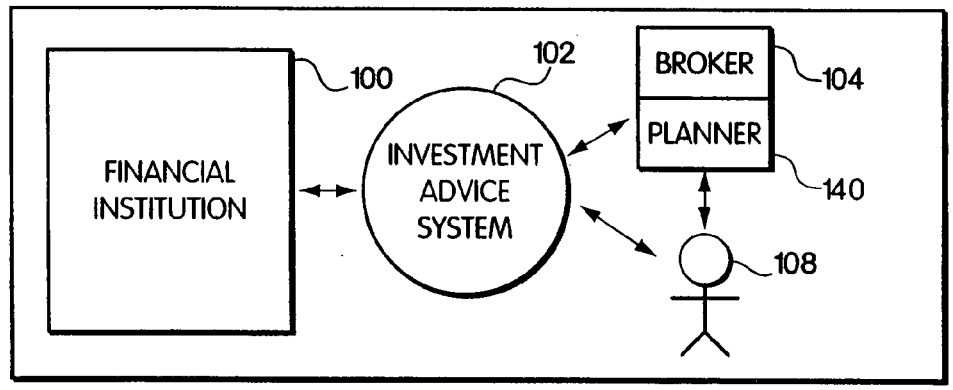
Figure 17C:
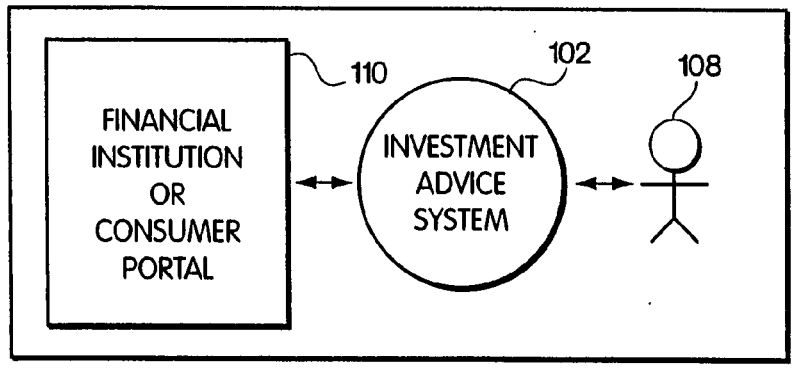

FIGS. 17A–17C show various implementations of a system according to the invention. In FIG. 17A, one embodiment of an investment advice system (IAS) 102 according to the invention operates between a financial institution 100 and a broker 104 or planner 140. In FIG. 17B, the IAS 102 operates between the financial institution 100 and either the broker 104, planner 140, or investor 108. In FIG. 17C, the IAS 102 operates between the financial institution or commercial portal 110 and the investor 108.

Figure 19:
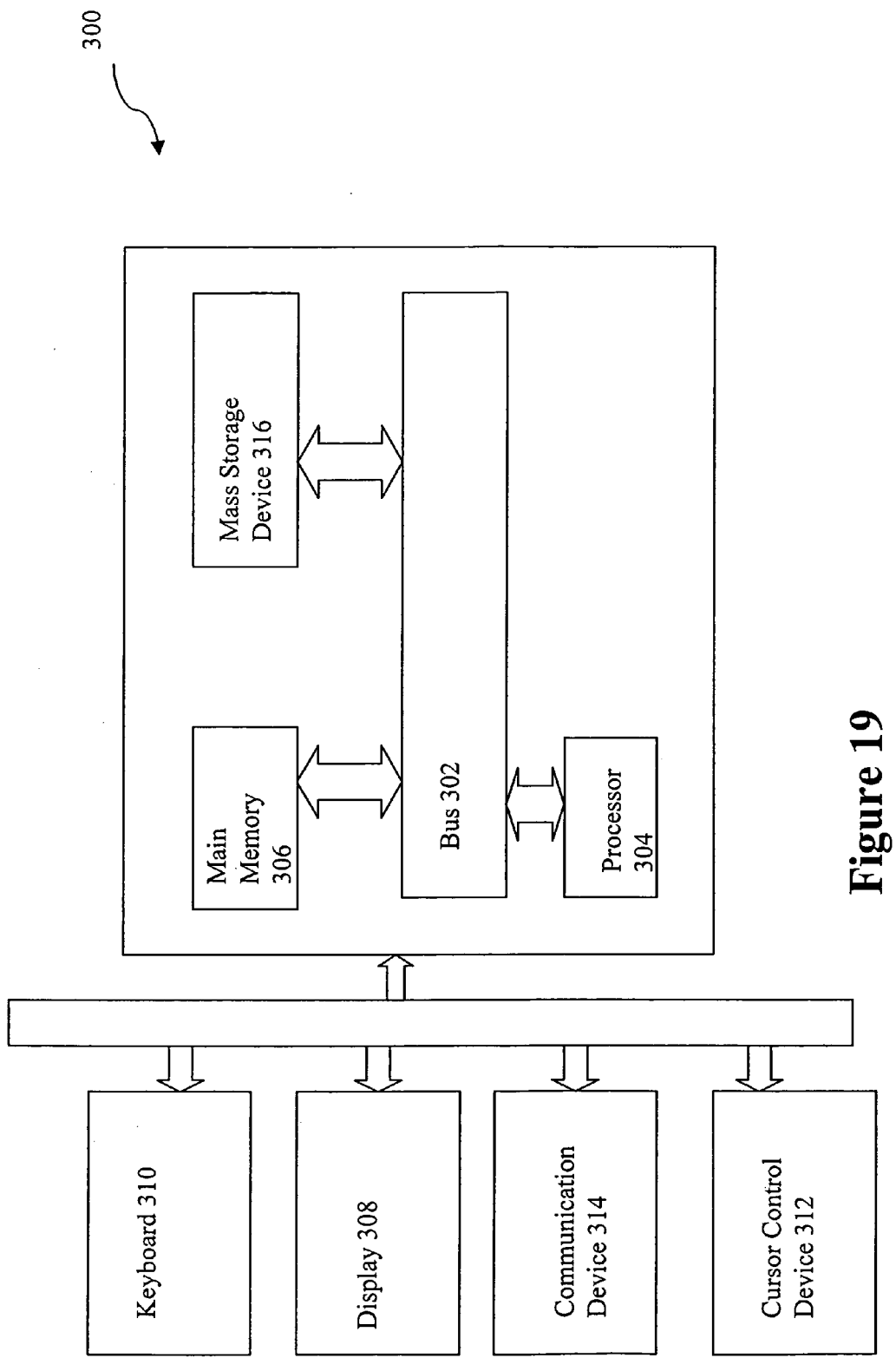
FIG. 19 is a block diagram showing a computer system for implementing one embodiment of the present invention.

With reference to FIG. 19, a system 300 representing an exemplary client 56 or server 32 that can implement features of the present invention includes a bus or other communication means 302 for communicating information between components of the system. The system 300 further includes a processor 304 coupled to the bus 302 and a main memory, e.g., a random access memory (RAM) or other dynamic storage device 306 also coupled to the bus. The RAM stores instructions for execution by the processor 304. The main memory can also store temporary variables. The system 300 can include a mass storage device 316 coupled to the bus 302 for storing information that is not accessed as regularly as information stored in RAM.

System 300 can include a display 308 for displaying information such as advice regarding the portfolio management to a user. The system can include an input devices such as a cursor control device 312 and a keyboard 310 for allowing a user input decisions and interactively examine the impact of those decisions. The impact of the decisions can include tax implications, the impact of the decisions on the user's portfolio's risk/reward balance, and the impact of the decisions on the user's stock holding rating as determined by advisors either separately or collectively.

The system 300 can also include a communication device 314. If the system 300 is implementing one portion of one embodiment of the invention, then the communication device 314 allows the system to communicate with other portions of the system and with the client 56. Alternatively, if the system 300 is implementing the system on a user's personal computer or personal digital assistant, the communication device 314 can include a network card, an RF transceiver, or other well-known communication device for coupling to a network.

Overall System Description

The system described above is: scalable to allow for reasonably quick and consistent response times; extensible so that businesses may have the option to integrate an embodiment of the invention into their legacy systems; and uses technologies which provide for a high degree of maintainability.

Choices for platforms include Windows 2000, SQL server and Windows NT. Development tools such as Visual InterDev for building the presentation layer (ASP) and Visual C++ for building the business layer provide for Rapid Application Development and a high level of integration with development management tools such as Visual Source Safe.

Scalability

Financial planners other highly trained personnel can use the present invention as a productivity tool. Therefore, the degree of performance required is much higher than that of a traditional network based application. Furthermore, the variability in the number of concurrent users at various installations requires that the Application is capable of taking advantage of more powerful hardware installations at locations with more users. The Application Architecture must therefore account for the possibility of multiple application servers as well as display layer servers. A Microsoft 2000 Load Balancing server provides a scalability solution, but only if the display layer and application layer are designed correctly. The most important criteria are 1) that the display/presentation layer and business layer objects must not maintain state and 2) that these objects can be pooled. The business layer objects can save and restore their state to and from the database server when appropriate Extensibility Client computing is constantly changing. Therefore, the system architecture uses an interface to the display layer that can be accessed using various technologies including, but not limited to ASP, HTML, XML, Win32, COM, WAP (Wireless Application Protocol) and RDP (Remote Desktop Protocol). One embodiment uses a traditional browser application designed for access by Internet Explorer version 5. This embodiment uses various client technologies including DHTML, ActiveX, and client side JavaScript.

In addition to the changing landscape of client computing, extensibility also deals with allowing customers to integrate the present invention into their existing applications. The system Architecture includes an application program interface (API) based on industry standard technologies such as ADO and OLE DB.

Finally, through the use of COM+ and server side JavaScript, object oriented principles such as polymorphism and inheritance are built into the application layer.

The invention claimed is:

1. A computer-implemented method for providing investment advice to a client over a computer network, the method comprising:
   providing a database maintaining portfolio information for a plurality of securities portfolios;
   providing a server computer operably coupled to the database and accessible via client computers to a plurality of clients, the server computer including:
   an asset allocator operative to receive one of a spend cash request, a raise cash request, a rebalance request, and a re-rank request;
   a ranker component in communication with the asset allocator;
   a security analyst component in communication with the asset allocator; and
   a portfolio component in communication with the asset allocator; and
      managing a securities portfolio identified by the database for a client by:
         receiving portfolio information;
   using a ranker component to pass a get benchmark request to the portfolio component;
      normalizing security forecasts from at least one advisor and translating the normalized forecasts into security forecast rankings;
   using a ranker component to pass a get security rankings request to a security analyst component;
   determining risk rankings for relevant securities using portfolio minus benchmark weights;
   determining combined rankings for proposed trades of relevant securities based at least in part on risk rankings and on security forecast rankings; and
   generating an order list based on the combined rankings.

2. The computer-implemented method of claim 1, wherein the portfolio information maintained by the database includes tax lot information.

3. The computer-implemented method of claim 2, wherein managing a securities portfolio includes:
   requesting tax lot information from the database for the portfolio, and
   proposing securities transactions to the client based at least in part on the tax lot information for the securities portfolio.

4. The computer-implemented method of claim 3, wherein providing a server comprises:
   providing a server including a broker connection aggregator; and wherein managing a securities portfolio further comprises:
   invoking the broker connection aggregator to provide a connection to a plurality of brokers over a computer network and to allow a client to execute securities transactions, through the broker connection, for securities portfolios identified by the database.

5. The computer-implemented method of claim 1, wherein providing a server further comprises
   providing a server including a portfolio tracker; and wherein managing a securities portfolio further comprises
   invoking the portfolio tracker to receive portfolio information for a securities portfolio from a client and to store the portfolio information for the securities portfolio in the database.

6. A system for providing investment advice, the system comprising:
   a database identifying a plurality of securities portfolios and maintaining portfolio information associated with the security portfolios; and
   a server computer operably coupled to the database and accessible via client computers to a plurality of clients; the server computer including:
      a trade advisor component operative to receive, from the database, portfolio information for a securities portfolio of a client, the trade advisor component proposing securities transactions based on a combined ranking of a return ranking and a risk ranking for each tradable security available to the client, the return ranking being based on an aggregation of normalized securities rankings from one or more analysts for each tradable security, the risk ranking being based on a normalized marginal contribution to risk of each security to the portfolio, the normalized marginal contribution to risk having been scaled by a factor reflecting a client's risk aversion.

7. The system of claim 6, wherein the portfolio information maintained by the database includes tax lot information for the securities included in the portfolios identified by the database.

8. The system of claim 7, wherein the combined ranking is further based on a tax ranking for securities in the portfolio, the tax ranking for each security being based on a normalized and scaled marginal tax gain or marginal tax loss resulting from the sale of the security as a percentage of the current price of the security.

9. The system of claim 6, wherein the server further includes graphical user interface generation means for providing a user interface, the user interface including a client proposed transaction input control whereby a client can input a proposed transaction for a portfolio identified by the investment advice service.

10. The system of claim 9, wherein the trade advisor component is operative to propose alternative transactions to the proposed transaction of the client based at least in part on the combined ranking for the proposed transaction.

11. A system for providing trading advice for a portfolio of securities, the system comprising:
   a ranker component operative to receive a request to rank relevant securities;

a portfolio component in communication with the ranker component and operative to receive a get benchmark request and a get tax lots request from the ranker component;

a security analyst component in communication with the ranker component and operative to receive a get security rankings request from the ranker component, the ranker component operative: to provide risk rankings of relevant securities using portfolio minus benchmark weights in determining a marginal contribution to risk associated with a relevant security; to determine tax rankings based in part on tax lot data; and to determine combined rankings of relevant securities as a weighted sum of risk rankings, security forecast rankings and tax rankings, the ranker component determining a marginal contribution to risk by:

adding a specified weighting to the portfolio;

determining a revised contribution to factor risk and residual risk;

subtracting original values; and dividing by a change in weight; and an asset allocator in communication with the ranker component, the asset allocator operative to receive combined rankings for relevant securities from the ranker component and to create a trade list based at least in part on the combined rankings.

12. A system for providing trading advice for a portfolio of securities, the system comprising:

a ranker component operative to receive a request to rank relevant securities;

a portfolio component in communication with the ranker component and operative to receive a get benchmark request from the ranker component; and a security analyst component in communication with the ranker component and operative to receive a get security rankings request from the ranker component, the ranker component operative to determine risk rankings of relevant securities using portfolio minus benchmark weights in determining combined rankings of relevant securities based at least in part on risk rankings and on security forecast rankings.

13. The system of claim 12 wherein the portfolio component is operative to receive a get tax lots request from the ranker component, wherein the ranker component is operative to determine tax rankings based in part on tax lot data, and wherein the ranker component is operative to determine the combined rankings of relevant securities as a weighted sum of the risk rankings, the security forecast rankings and the tax rankings.

14. The system of claim 12 wherein the system further comprises:

an asset allocator in communication with the ranker component, the asset allocator operative to receive combined rankings for relevant securities from the ranker component and to create a trade list based at least in part on the combined rankings.

15. The system of claim 12 wherein the ranker component is operative to determine a risk ranking for a relevant security by determining a marginal contribution to risk associated with the relevant security and wherein the ranker component is operative to determine the combined rankings as a weighted sum of the risk rankings and the security forecast rankings.

16. The system of claim 15 wherein the ranker component is operative to determine a risk ranking for a relevant security by adding a specified weighting to the portfolio, determining a revised contribution to factor risk and residual risk, subtracting original values, and dividing by a change in weight.

17. The system of claim 16 wherein the ranker component is operative to determine a risk ranking for a relevant security by: for the relevant security adding about a 0.1% weighting to the portfolio.

18. The system of claim 17 wherein the relevant securities comprise a universe of securities including securities held in the portfolio and securities not held in the portfolio.

19. The system of claim 14 wherein the asset allocator is operative to receive one of a raise cash value, a spend cash value and a maximum turnover and to pass a rank portfolio request to the ranker component.

20. A method for providing trading advice for a portfolio of securities, the method comprising receiving portfolio information;

using a ranker component to pass a get benchmark request to a portfolio component;

normalizing security forecasts from at least one advisor and translating the normalized forecasts into security forecast rankings;

using a ranker component to pass a get security rankings request to a security analyst component;

determining risk rankings for relevant securities using portfolio minus benchmark weights;

determining combined rankings for proposed trades of relevant securities based at least in part on risk rankings and on security forecast rankings; and generating an order list based on the combined rankings.

21. The method of claim 20 wherein the method further comprises:

using the ranker component to pass a get tax lots request to the portfolio component; and determining tax rankings based at least in part on tax lot data; and wherein determining combined rankings comprises determining combined rankings as a weighted sum of the risk rankings, the security forecast rankings and the tax rankings.

22. The method of claim 20 wherein determining risk rankings comprises determining a risk ranking for a relevant security by determining a marginal contribution to risk associated with the relevant security and wherein determining the combined rankings comprises determining the combined rankings as a weighted sum of the risk rankings and the security forecast rankings.

23. The method of claim 20 wherein determining a risk ranking for a relevant security comprises:

determining a risk ranking for the relevant security by: adding a specified weighting to the portfolio; determining a revised contribution to factor risk and residual risk;

subtracting original values; and dividing by a change in weight.

24. The method of claim 23 wherein determining a risk ranking comprises determining a risk ranking for a relevant security by:

for the relevant security adding about a 0.1% weighting to the portfolio.

25. The method of claim 20 wherein the relevant securities comprise a universe of securities including securities held in the portfolio and securities not held in the portfolio.

26. The method of claim 20 wherein normalizing security rankings comprises collecting security rankings for a security from a plurality of security analysts, aggregating the security rankings for the security onto a uniform ranking scale and determining a consensus forecast from a plurality of security analysts.

27. A method for assisting a user to manage a plurality of portfolios, the method comprising:
- displaying a rebalance accounts display for providing information about a plurality of accounts;
- allowing a user to select one or more accounts for rebalancing;
- allowing a user to select a trading template to apply to the selected accounts wherein at least one of the trades in the trade template is generated by a method including:
- using a ranker component to pass a get benchmark request to a portfolio component;
- using a ranker component to pass a get security rankings request to a security analyst component;
- determining risk rankings for relevant securities using portfolio minus benchmark weights;
- determining combined rankings for proposed trades of relevant securities based at least in part on risk rankings and on security forecast rankings; and
- generating an order list based on the combined rankings; and
- applying the trading template to the selected accounts.

28. The method of claim 27, wherein the method further comprises:
- displaying a my accounts display including:
- an account list display which lists information about accounts that the user manages;
- a stock alerts display which lists information about stocks of note; and
- a risk alerts display which provides information about accounts with a high-risk rating.

29. The method of claim 28, wherein the method further comprises:
- displaying a trade execution results page including a save trade template display that allows a user to name and save a set of trades as a trade template for rebalancing other accounts.

30. The method of claim 27, wherein displaying a rebalance accounts display for providing information about a plurality of accounts includes current risk and stock rating and projected risk and stock rating.

* * * * *